US011792509B2

(12) United States Patent
Takanashi

(10) Patent No.: US 11,792,509 B2
(45) Date of Patent: Oct. 17, 2023

(54) ACCESSORY DEVICE, IMAGING APPARATUS, AND METHODS FOR CONTROLLING THE SAME

(71) Applicant: CANON KABUSHIKI KAISHA, Tokyo (JP)

(72) Inventor: Hideya Takanashi, Isehara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/371,807

(22) Filed: Jul. 9, 2021

(65) Prior Publication Data
US 2021/0337107 A1 Oct. 28, 2021

Related U.S. Application Data

(63) Continuation of application No. 16/444,920, filed on Jun. 18, 2019, now Pat. No. 11,089,199.

(30) Foreign Application Priority Data

Jun. 21, 2018 (JP) .................. 2018-118125

(51) Int. Cl.
*H04N 23/663* (2023.01)
*H04N 23/55* (2023.01)
*H04N 23/62* (2023.01)
*H04N 23/69* (2023.01)
*H04N 23/959* (2023.01)

(52) U.S. Cl.
CPC ........... *H04N 23/663* (2023.01); *H04N 23/55* (2023.01); *H04N 23/62* (2023.01); *H04N 23/69* (2023.01); *H04N 23/959* (2023.01)

(58) Field of Classification Search
None
See application file for complete search history.

(56) References Cited

U.S. PATENT DOCUMENTS

| 6,529,236 | B1 | 3/2003 | Watanabe |
| 8,712,231 | B2* | 4/2014 | Ohtsuka ................. G03B 17/14 396/312 |
| 11,089,199 | B2* | 8/2021 | Takanashi .......... H04N 5/23245 |
| 2002/0118963 | A1 | 8/2002 | Uenaka et al. |
| 2010/0208122 | A1* | 8/2010 | Yumiki ............ H04N 5/232123 348/E5.022 |
| 2013/0022348 | A1* | 1/2013 | Hasuda ................ G03B 17/565 396/530 |
| 2016/0100130 | A1 | 4/2016 | Holzman et al. |

FOREIGN PATENT DOCUMENTS

| CN | 103475811 A | 12/2013 |
| CN | 107659756 A | 2/2018 |
| JP | 2004294932 A | 10/2004 |
| JP | 2007017746 A | 1/2007 |

(Continued)

*Primary Examiner* — Cynthia Segura
(74) *Attorney, Agent, or Firm* — Canon U.S.A., Inc. IP Division

(57) ABSTRACT

A communication control unit of an interchangeable lens transmits information regarding distance information corresponding to the focus lens position to a camera main body to which the interchangeable lens unit is attached. The camera main body include a display unit, and perform display at the display unit based on the information received from the interchangeable lens.

19 Claims, 21 Drawing Sheets

(56) References Cited

FOREIGN PATENT DOCUMENTS

| | | | |
|---|---|---|---|
| JP | 2012154967 | A | 8/2012 |
| JP | 2012177929 | A | 9/2012 |
| JP | 2014153625 | A | 8/2014 |
| JP | 2017181980 | A | 10/2017 |
| JP | 2017187811 | A | 10/2017 |
| JP | 2017219591 | A | 12/2017 |
| JP | 2018055132 | A | 4/2018 |
| JP | 2018081219 | A | 5/2018 |
| WO | 2015137458 | A1 | 9/2015 |
| WO | 2017170386 | A1 | 10/2017 |

* cited by examiner

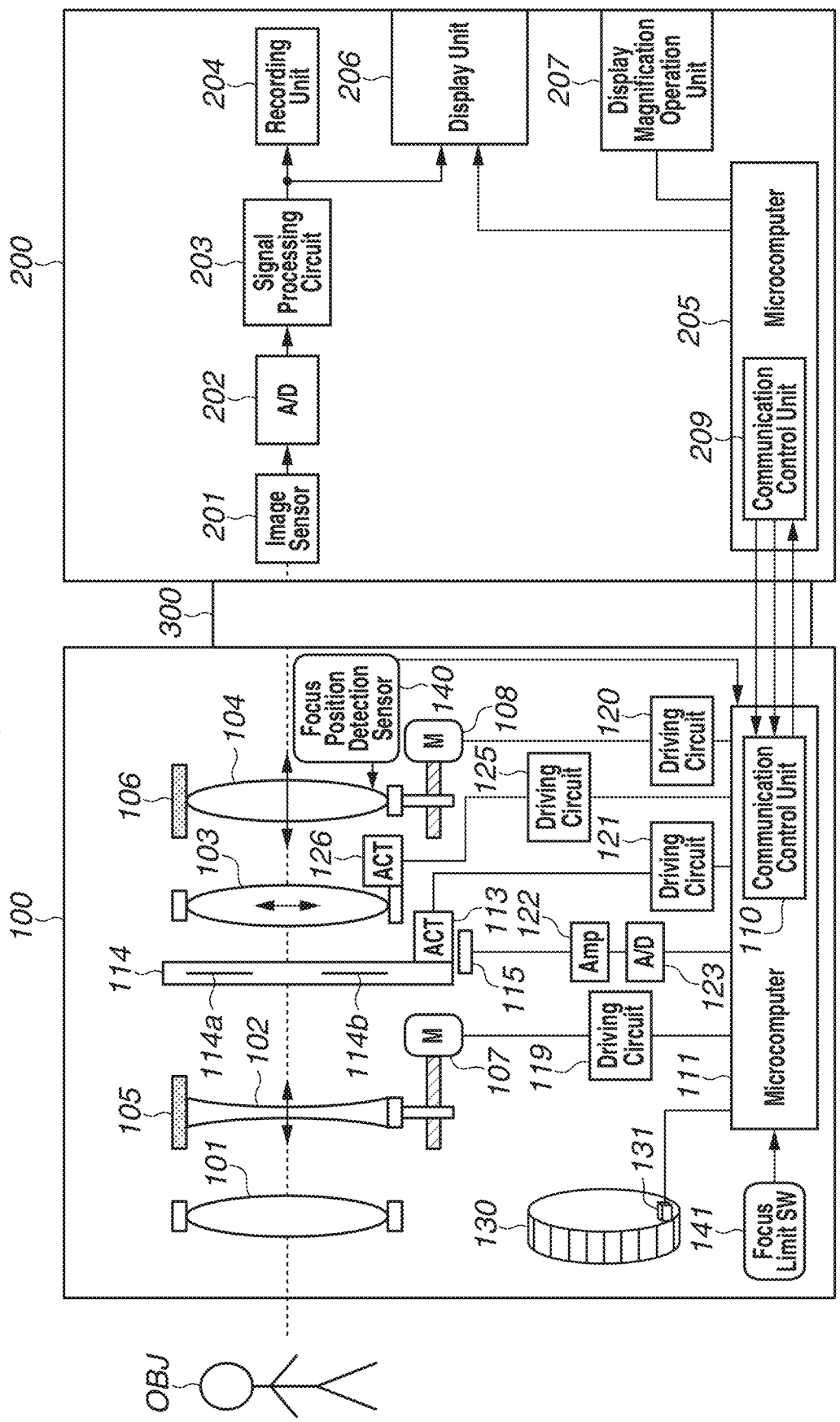

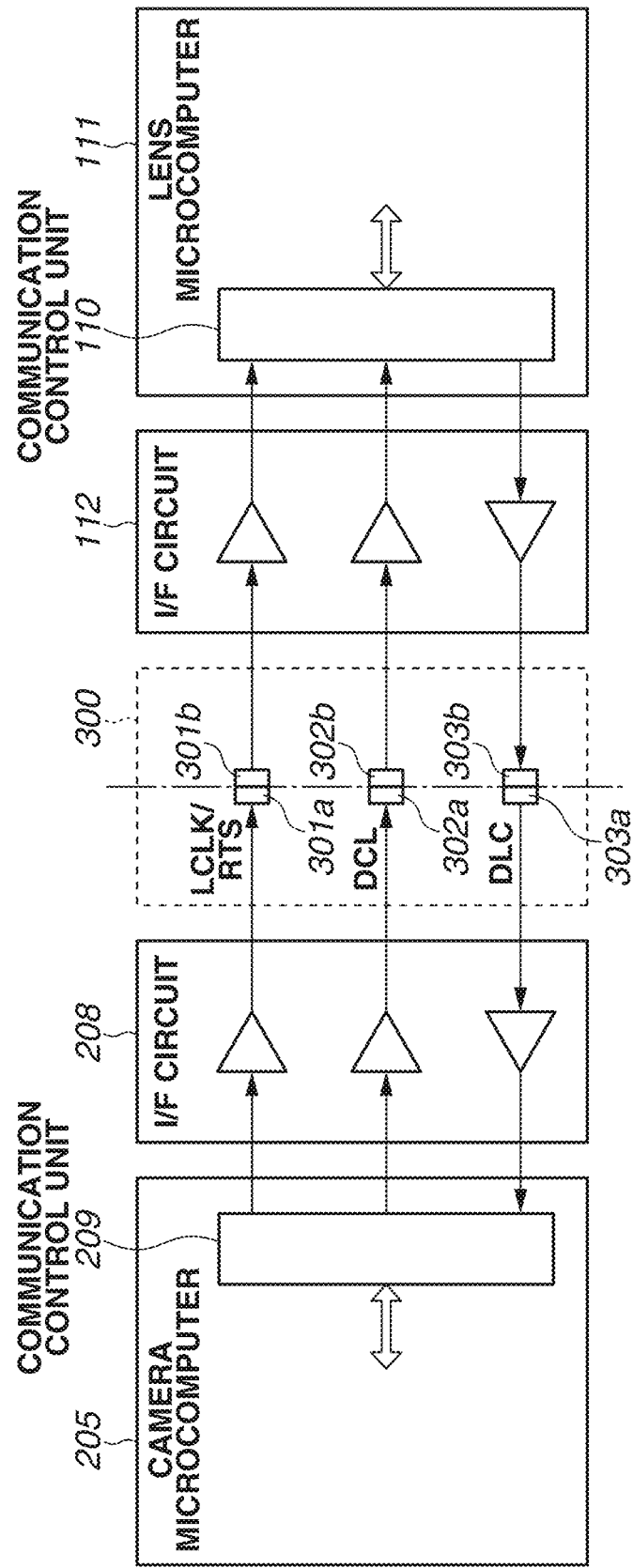

Communication CMD1

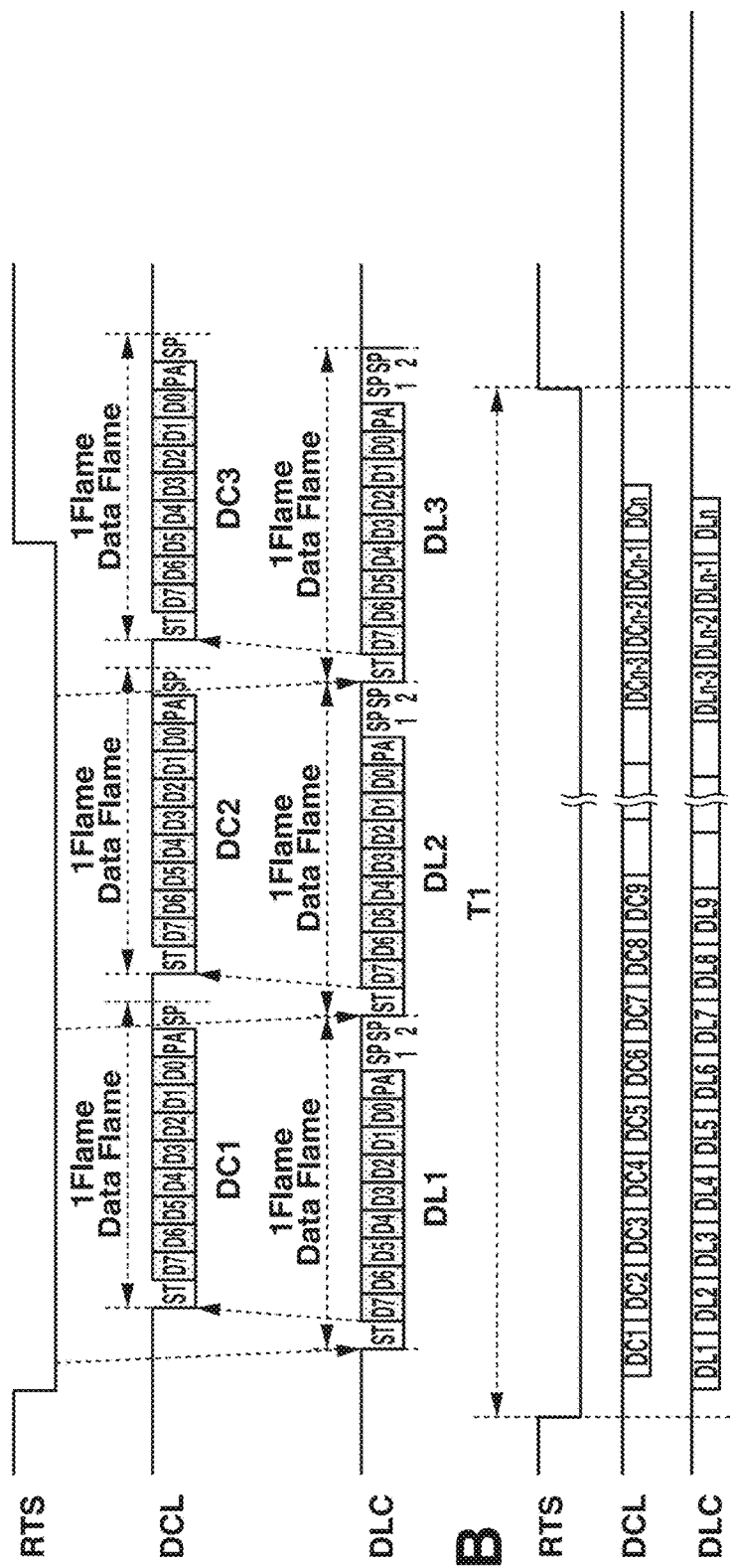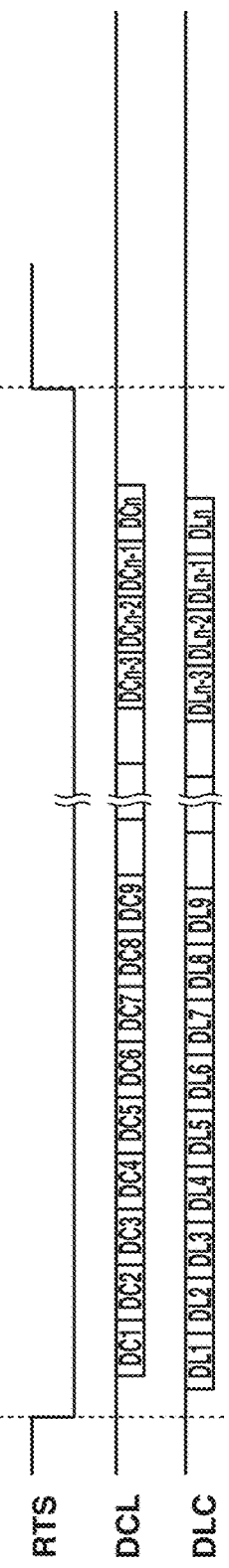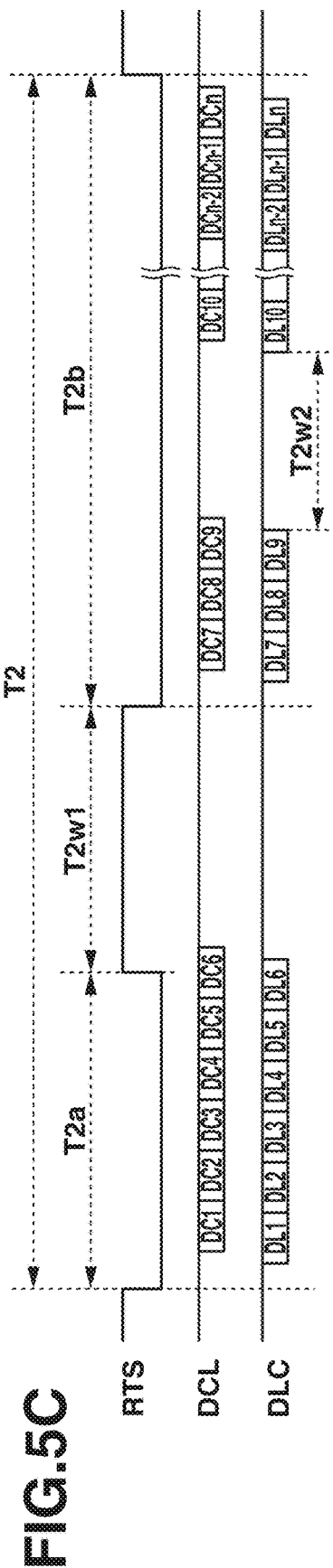

FIG.9
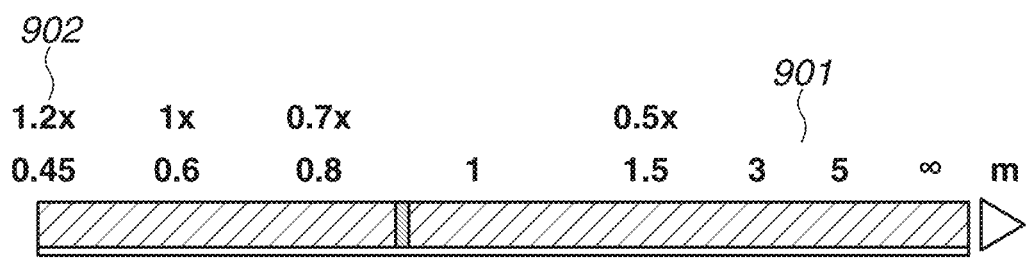
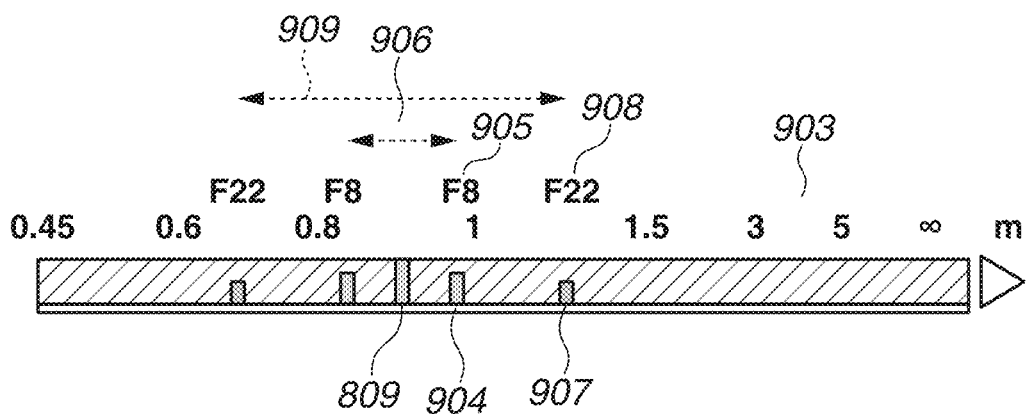

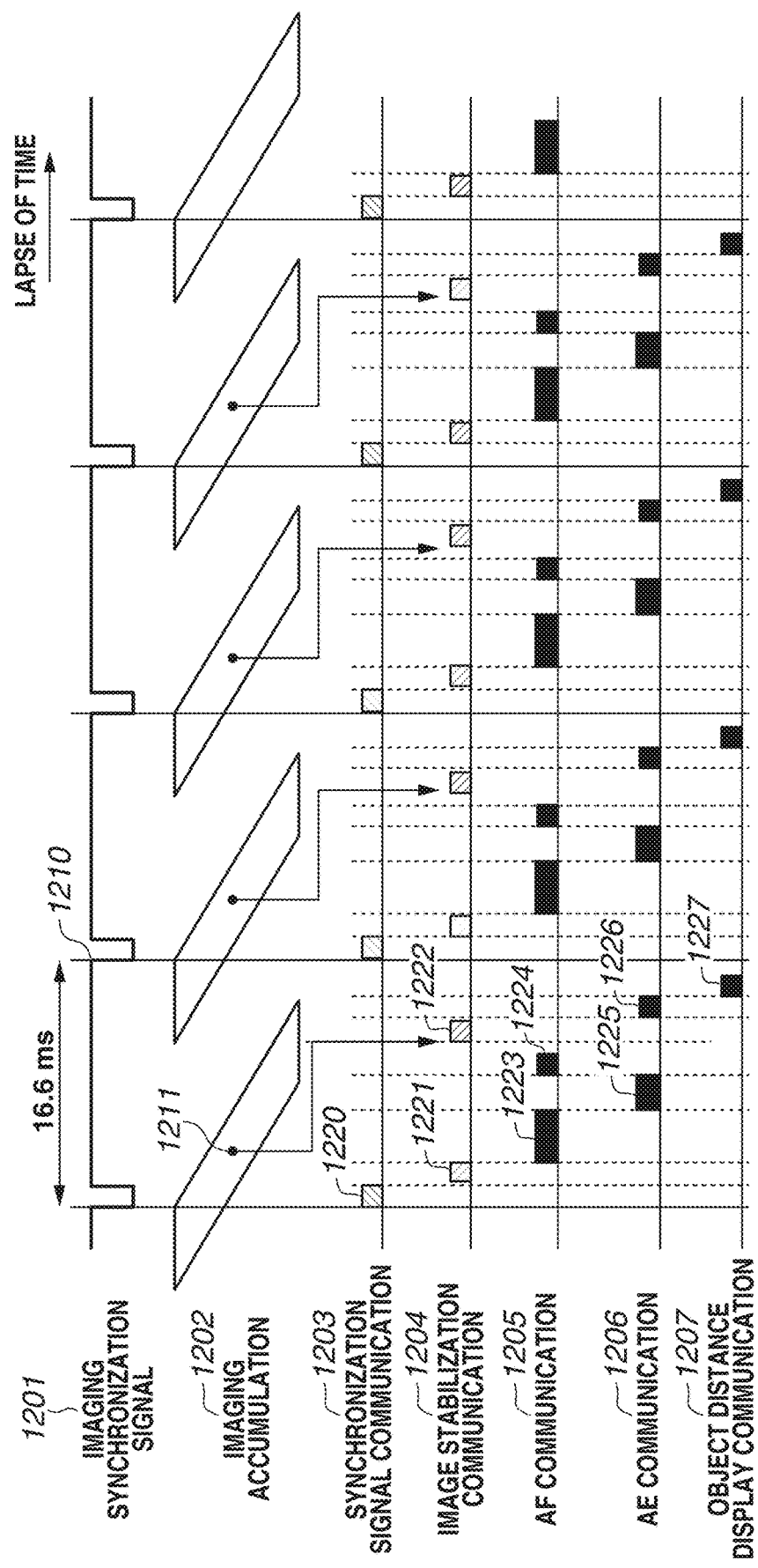

ACCESSORY DEVICE, IMAGING APPARATUS, AND METHODS FOR CONTROLLING THE SAME

CROSS-REFERENCE TO RELATED APPLICATIONS

This application is a Continuation of U.S. patent application Ser. No. 16/444,920, filed Jun. 18, 2019, which claims the benefit of Japanese Patent Application No. 2018-118125, filed Jun. 21, 2018, both of which are hereby incorporated by reference herein in their entirety.

BACKGROUND

Field of the Disclosure

The present disclosure relates to communication with an accessory device regarding information to be displayed at a display unit of an imaging apparatus.

Description of the Related Art

A technique is known in which a camera displays information regarding a lens at a display unit such as a display included in the camera.

Japanese Patent Application Laid-Open No. 2010-2823 discusses a technique for displaying focus position (object distance) information regarding a lens at a display unit of a camera, instead of a display member of a lens barrel of the lens.

Further, Japanese Patent Application Laid-Open No. 2007-72407 discusses a technique for displaying position information regarding a focus lens of a lens at a camera and further displaying depth information at the camera.

In the conventional art discussed in Japanese Patent Application Laid-Open No. 2010-2823 and Japanese Patent Application Laid-Open No. 2007-72407, the lens barrel of the lens does not need to include a display member. Thus, it is possible to obtain the effect of contributing to making the lens small and light. However, Japanese Patent Application Laid-Open No. 2010-2823 and Japanese Patent Application Laid-Open No. 2007-72407 do not discuss the specific content of data to be communicated from the lens to the camera to display focus distance information and a scale at the display unit included in the camera. Thus, Japanese Patent Application Laid-Open No. 2010-2823 and Japanese Patent Application Laid-Open No. 2007-72407 have an issue that for example, indices of distance information cannot be displayed according to the differences in specs between interchangeable lenses such as a wide angle lens and a telephoto lens, or the differences in specs between cameras, such as the numbers of pixels of display units of the cameras.

SUMMARY

The present disclosure is directed to providing an accessory device and an imaging apparatus capable of appropriately displaying information according to an interchangeable lens at a camera display unit, and methods for controlling the accessory device and the imaging apparatus.

According to embodiments of the present disclosure, an accessory device that is attachable to an imaging apparatus including a display unit including a display area where distance information corresponding to a focus lens position is displayed, and includes a focus lens that changes the focus lens position includes a communication control unit configured to control communication with the imaging apparatus via a communication unit, wherein the communication control unit transmits (A) information indicating the number of pieces of distance information displayed in association with the display area, (B) information indicating pieces of distance information the number of which is indicated by the number, (C) information indicating a position of each piece of distance information relative to the display area, and (D) information indicating distance information corresponding to the focus lens position.

According to embodiments of the present disclosure, an imaging apparatus to which an accessory device including a focus lens that changes a focus lens position is attachable includes a display unit including a display area where distance information corresponding to the focus lens position is displayed, and a communication control unit configured to control communication with the accessory device via a communication unit, wherein the communication control unit receives (A) information indicating the number of pieces of distance information displayed in association with the display area, (B) information indicating pieces of distance information the number of which is indicated by the number, (C) information indicating a position of each piece of distance information relative to the display area, and (D) information indicating distance information corresponding to the focus lens position.

Further features of the present disclosure will become apparent from the following description of exemplary embodiments with reference to the attached drawings.

BRIEF DESCRIPTION OF THE DRAWINGS

FIG. 1A is a diagram illustrating a configuration of a camera system including an imaging apparatus and an accessory device according to an exemplary embodiment of the present disclosure.

FIG. 2 is a schematic diagram illustrating communication circuits between the imaging apparatus and the accessory device.

FIGS. 5A, 5B, and 5C are schematic diagrams illustrating communication waveforms in a communication mode M3.

FIG. 9 is schematic screen diagrams illustrating magnification information and depth-of-field information on the focus distance bar information displayed in the imaging apparatus.

FIG. 12 is a timing chart illustrating a communication status in steady states of the imaging apparatus and the accessory device.

DESCRIPTION OF THE EMBODIMENTS

Figure 1B:
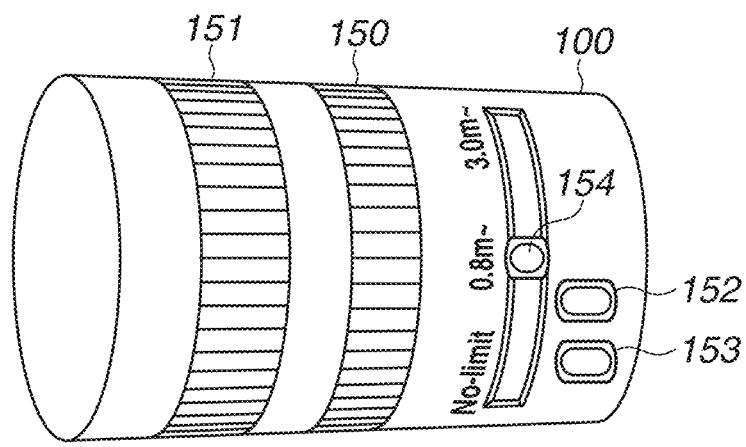
FIG. 1B is a diagram illustrating an example of an external appearance of an interchangeable lens and various operation members.

A first exemplary embodiment is described. Based on the attached drawings, a detailed description will be given below of a communication control method for controlling communication between an interchangeable lens as an accessory device according to the present disclosure and a camera main body as an imaging apparatus according to the present disclosure. First, the definitions of terms in the present exemplary embodiment are described.

A "communication format" refers to the rules of the entirety of communication between the camera main body and the interchangeable lens. A "communication method" means a clock synchronization method and an asynchronous method. The clock synchronization method is a communication method A, and the asynchronous method is a communication method B. A "data format" refers to whether a waiting-for-communication request signal (a busy signal) can be added. A data format that permits the addition of the busy signal is a "format F1", and a data format that prohibits the addition of the busy signal is a "format F2".

A "communication mode" means the combination of the communication method and the data format. In the present exemplary embodiment, the following three communication modes are described. A "communication mode M1" is the communication mode of the communication method A and the format F1. A "communication mode M2" is the communication mode of the communication method B and the format F1. Further, a "communication mode M3" is the communication mode of the communication method B and the format F2.

The camera main body performs communication by appropriately switching the above communication modes M1, M2, and M3, and thereby can select an appropriate communication mode based on the combination of the camera main body and the interchangeable lens or the image capturing mode.

For example, in a case where the camera main body and the interchangeable lens are compatible with the communication mode M2, and transmit and receive a large amount of data, the communication mode of each of the camera main body and the interchangeable lens is switched to the communication mode M3, and then, high-speed data communication in which the addition of the busy signal is prohibited is executed. In a case where it takes some time to perform data processing in the interchangeable lens, the communication mode of each of the camera main body and the interchangeable lens is switched to the communication mode M2, and then, data communication in which the addition of the busy signal is permitted is performed. This enables the execution of data communication in which communication does not break down between the camera main body and the interchangeable lens.

<Basic Configurations of Camera Main Body 200 and Interchangeable Lens 100>

FIG. 1A illustrates the configuration of an imaging system (hereinafter referred to as a "camera system") including a camera main body 200 as an imaging apparatus according to the first exemplary embodiment of the present disclosure and an interchangeable lens 100 detachably attached to the camera main body 200, as an accessory device according to the first exemplary embodiment of the present disclosure.

The camera main body 200 and the interchangeable lens 100 transmit control commands and internal information via communication control units included in the camera main body 200 (a communication control unit 209) and the interchangeable lens 100 (a communication control unit 110). Each communication control unit supports a plurality of communication formats. Based on the type of the communication data or the purpose of communication, the communication control units switch to the same communication format in synchronization with each other and thereby can select optimal communication formats for various situations.

First, the specific configurations of the interchangeable lens 100 and the camera main body 200 are described. The interchangeable lens 100 and the camera main body 200 are mechanically and electrically connected together via mount portions that are joint mechanisms (not illustrated) and communication terminal groups included in the mount portions. The interchangeable lens 100 receives power supplied from the camera main body 200 via a power supply terminal (not illustrated) provided in the mount portion of the interchangeable lens 100 and controls various actuators and a lens microcomputer 111. Further, the interchangeable lens 100 and the camera main body 200 communicate with each other via a communication terminal group 300 (illustrated in FIG. 2) provided in the mount portions. The communication terminal group 300 includes a communication terminal group 300a (an example of a communication unit of the imaging apparatus) provided in the mount portion of the camera main body 200, and a communication terminal group 300b (an example of a communication unit of the accessory device) provided in the mount portion of the interchangeable lens 100. The communication terminal group 300a includes a communication terminal 301a (an example of a first communication unit of the imaging apparatus), a communication terminal 302a (an example of a second communication unit of the imaging apparatus), and a communication terminal 303a (an example of a third communication unit of the imaging apparatus). The communication terminal group 300b includes a communication terminal 301b (an example of a first communication unit of the accessory device), a communication terminal 302b (an example of a second communication unit of the accessory device), and a communication terminal 303b (an example of a third communication unit of the accessory device).

The interchangeable lens 100 includes an imaging optical system. The imaging optical system includes a field lens 101, a variable magnification lens 102 that changes the magnification, a diaphragm unit 114 that adjusts the amount of light, an image blur correction lens 103, and a focus lens 104 that adjusts the focus, in this order from an object OBJ side.

The variable magnification lens 102 and the focus lens 104 are held by lens holding frames 105 and 106, respectively. The lens holding frames 105 and 106 are guided movably in the optical axis direction, which is indicated by a dashed line in FIG. 1A, by a guide shaft (not illustrated) and driven in the optical axis direction by stepping motors 107 and 108, respectively. The stepping motors 107 and 108 move the variable magnification lens 102 and the focus lens 104, respectively, in synchronization with driving pulses.

The image blur correction lens 103 moves in a direction orthogonal to the optical axis of the imaging optical system, thereby reducing image blur due to camera shake.

A lens microcomputer 111 is an accessory control unit that controls the operations of components in the interchangeable lens 100. The lens microcomputer 111 receives a control command transmitted from the camera main body 200 via the communication control unit 110 as an accessory communication control unit and receives a transmission request to transmit lens data. Further, the lens microcomputer 111 performs lens control corresponding to the control command and transmits lens data corresponding to the transmission request to the camera main body 200 via the communication control unit 110.

Furthermore, in response to a command regarding a change in the magnification or focusing in the control command, the lens microcomputer 111 outputs a driving signal to a zoom driving circuit 119 or a focus driving circuit 120, thereby driving the stepping motor 107 or 108, respectively. Consequently, the lens microcomputer 111 performs a zoom process for controlling a magnification change operation by the variable magnification lens 102, or an autofocus process for controlling a focus adjustment operation by the focus lens 104. A focus position detection sensor 140 is a sensor for detecting the focus position when the focus lens 104 is caused to operate by the autofocus process or a manual focus process based on a user operation. The lens microcomputer 111 acquires position information regarding the focus lens 104 from the output of the focus position detection sensor 140.

A lens barrel includes an autofocus/manual focus (AF/MF) selection switch described below with reference to FIG. 1B that is used to switch autofocus and manual focus, and a focus limit switch 141 that limits the driving range of the focus lens 104. The focus limit switch 141 (also referred to as a "first operation member") is a switch that enables the selection of, for example, "0.8 m to ∞" and "3 m to ∞". The focus limit switch 141 performs control to move the focus lens 104 in a range limited by autofocus control. For example, to capture an image of an animal in a cage, the range where the focus lens 104 is moved is limited such that the closest side is not brought into focus. In an image capturing scene where focusing control should be performed by being limited to a predetermined distance range, a setting for thus limiting the range is effective.

The diaphragm unit 114 includes diaphragm blades 114a and 114b. The states of the diaphragm blades 114a and 114b are detected by a Hall element 115 and input to the lens microcomputer 111 via an amplification circuit 122 and an analog-to-digital (A/D) conversion circuit 123. Based on an input signal from the A/D conversion circuit 123, the lens microcomputer 111 outputs a driving signal to a diaphragm driving circuit 121, thereby driving a diaphragm actuator 113. This controls the amount-of-light adjustment operation of the diaphragm unit 114.

Further, based on shake detected by a shake sensor (not illustrated) of a vibrating gyroscope provided in the interchangeable lens 100, the lens microcomputer 111 drives an image stabilization actuator 126 via an image stabilization driving circuit 125. Consequently, an image stabilization process for controlling the shifting operation of the image blur correction lens 103 is performed. Furthermore, the shake sensor of the vibrating gyroscope outputs signal information as camera shake information regarding a user, and the lens microcomputer 111 acquires the current camera shake state information.

In the present exemplary embodiment, for example, the focus position information obtained by the focus position detection sensor 140, the camera shake state information obtained by the shake sensor of the vibrating gyroscope, and zoom position information regarding a zoom lens are communicated to the camera main body 200. However, not only the focus position, the camera shake state, and the zoom position, but also any information held in the interchangeable lens 100 may be a communication target.

The camera main body 200 includes an image sensor 201 such as a charge-coupled device (CCD) sensor or a complementary metal-oxide-semiconductor (CMOS) sensor, an A/D conversion circuit 202, a signal processing circuit 203, and a recording unit 204, a camera microcomputer 205, and a display unit 206 (an example of a display unit).

The image sensor 201 photoelectrically converts an object image formed by the imaging optical system in the interchangeable lens 100 and outputs an electric signal (an analog signal). The A/D conversion circuit 202 converts the analog signal from the image sensor 201 into a digital signal. The signal processing circuit 203 performs various types of image processing on the digital signal from the A/D conversion circuit 202, thereby generating a video signal.

Further, the signal processing circuit 203 also generates information regarding the contrast state of the object image, i.e., focus information indicating the focus state of the imaging optical system and luminance information indicating the exposure state of the imaging optical system, from the video signal. The signal processing circuit 203 outputs the video signal to the display unit 206, and the display unit 206 displays the video signal as a live view image used to confirm the composition or the focus state.

In the live view image displayed at the display unit 206, various pieces of setting information, such as the shutter speed and the diaphragm setting value, regarding the camera main body 200 are displayed. Further, in the present exemplary embodiment, the focus position information regarding the lens 100 communicated from the lens microcomputer 111 via the communication control unit 110 is displayed in a superimposed manner on the live view screen. A specific example of the display will be described below with reference to FIG. 8.

In response to inputs from camera operation members such as an image capturing instruction switch and various setting switches (not illustrated), the camera microcomputer 205 as a camera control unit controls the camera main body 200. Further, based on an operation on a zoom switch (not illustrated), the camera microcomputer 205 transmits a control command regarding the magnification change operation of the variable magnification lens 102 to the lens microcomputer 111 via a communication interface (I/F) circuit 208. Furthermore, the camera microcomputer 205 transmits a control command regarding the amount-of-light adjustment operation of the diaphragm unit 114 based on the luminance information or the focus adjustment operation of the focus lens 104 based on the focus information, to the lens microcomputer 111 via the communication I/F circuit 208.

Further, In response to inputs from the camera operation members, a menu screen for changing various settings of the camera can be displayed at the display unit 206. It is possible to select whether to display various pieces of information (such as object distance information) regarding the lens 100 according to the present exemplary embodiment at the display unit 206, or select information as a target to be displayed (the focus position, magnification information, or camera shake state).

FIG. 1B illustrates an example of the external appearance of the interchangeable lens 100 and various operation members. A ring 150 is a zoom ring and can drive the zoom position from a wide area to a telephoto area based on a user operation or a communication instruction from the camera.

A ring 151 is a focus ring and enables the user to perform a manual focus operation.

A switch 152 is an operation member that enables switching an autofocus mode and a manual focus mode.

A switch 153 is an operation member that enables switching whether to enable or disable an image stabilization function.

A switch 154 corresponds to the focus limit switch 141 in FIG. 1A. In this example, it is possible to switch among three states, i.e., "no limit", "0.8 m to ∞", and "3.0 m to ∞".

<Basic Configuration for Communication>

Next, with reference to FIG. 2, a description is given of communication circuits configured between the camera main body 200 and the interchangeable lens 100, and communication control performed between the camera main body 200 and the interchangeable lens 100. The camera microcomputer 205 has the function of managing a communication format between the camera microcomputer 205 and the lens microcomputer 111, and the function of notifying the lens microcomputer 111 of a transmission request. The lens microcomputer 111 has the function of generating lens data, and the function of transmitting the lens data.

The camera microcomputer 205 and the lens microcomputer 111 communicate with each other via the communication terminal group 300 provided in the mount portions, and the communication I/F circuits 208 and a communication I/F circuit 112 provided in the camera microcomputer 205 and the lens microcomputer 111, respectively.

In the present exemplary embodiment, the camera microcomputer 205 and the lens microcomputer 111 perform serial communication by the communication methods A and B, which are three-wire communication methods using three channels, i.e., first, second, and third communication channels.

Through the first communication channel, communication is performed via the communication terminals 301a and 301b.

The first communication channel is a notification channel that serves as a clock channel in the communication method A and serves as a transmission request channel in the communication method B.

Through the second communication channel, communication is performed via the communication terminals 302a and 302b.

The second communication channel is used to transmit camera data from the camera microcomputer 205 to the lens microcomputer 111. The camera data transmitted as a signal from the camera microcomputer 205 to the lens microcomputer 111 through the second communication channel is referred to as a "camera data signal DCL".

Through the third communication channel, communication is performed via the communication terminals 303a and 303b. The third communication channel is used to transmit lens data from the lens microcomputer 111 to the camera microcomputer 205. The lens data transmitted as a signal from the lens microcomputer 111 to the camera microcomputer 205 through the third communication channel is referred to as a "lens data signal DLC".

<Communication Method A>

First, communication by the communication method A is described. In the communication method A, the camera microcomputer 205 as a communication master outputs a clock signal LCLK to the lens microcomputer 111 as a communication slave via the clock channel. The camera data signal DCL includes a control command or a transmission request command from the camera microcomputer 205 to the lens microcomputer 111. On the other hand, the lens data signal DLC includes various pieces of data to be transmitted from the lens microcomputer 111 to the camera microcomputer 205 in synchronization with the clock signal LCLK. The camera microcomputer 205 and the lens microcomputer 111 can communicate with each other by a full-duplex communication method (a full-duplex method) for simultaneously transmitting and receiving data to and from each other in synchronization with the common clock signal LCLK.

Figure 3A:
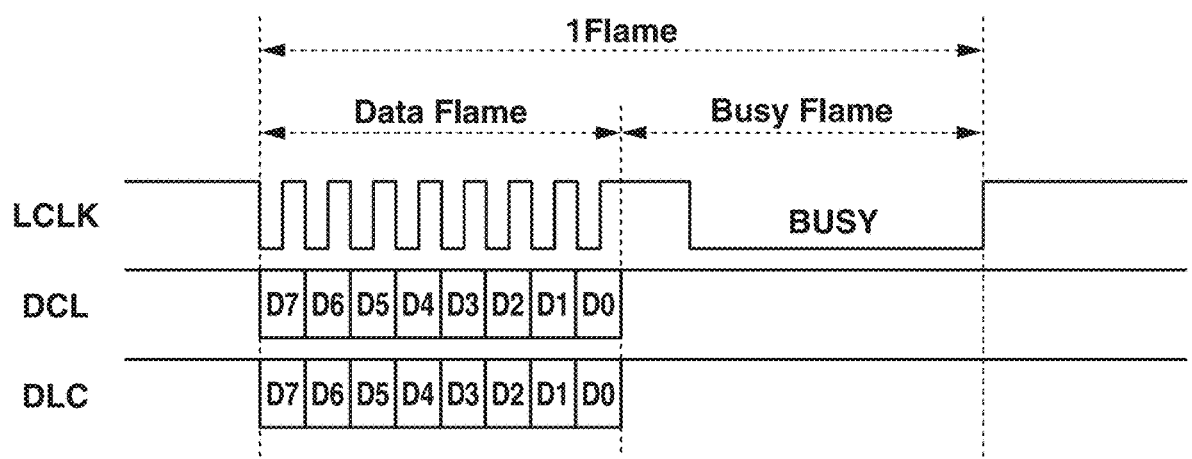
FIGS. 3A and 3B are schematic diagrams illustrating communication waveforms in a communication mode M1.
Figure 3B:
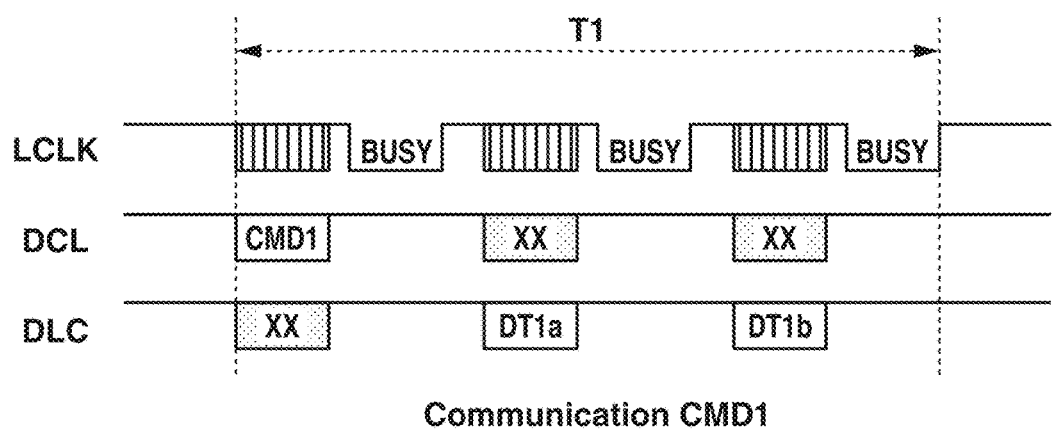

FIGS. 3A and 3B illustrate the waveforms of signals exchanged between the camera microcomputer 205 and the lens microcomputer 111. The rules of the procedure of the exchange are referred to as a "communication protocol".

FIG. 3A illustrates signal waveforms of one frame, which is the smallest unit of communication. First, the camera microcomputer 205 outputs the clock signal LCLK including a set of eight-cycle clock pulses and also transmits the camera data signal DCL to the lens microcomputer 111 in synchronization with the clock signal LCLK. Simultaneously with this, the camera microcomputer 205 receives the lens data signal DLC output from the lens microcomputer 111 in synchronization with the clock signal LCLK.

One byte (eight bits) of data is thus transmitted and received between the lens microcomputer 111 and the camera microcomputer 205 in synchronization with the clock signal LCLK as a set. The period of the transmission and reception of the one byte of data is referred to as a "data frame". After the transmission and reception of the one byte of data, the lens microcomputer 111 transmits a signal (hereinafter referred to as a "busy signal") for notifying the camera microcomputer 205 of a waiting-for-communication request BUSY, thereby inserting a waiting-for-communication period. The waiting-for-communication period is referred to as a "busy frame". While receiving the busy frame, the camera microcomputer 205 is in a waiting-for-communication state. Then, the unit of communication composed of a set of the data frame period and the busy frame period is one frame. There is also a case where the busy frame is not added depending on the communication status. In this case, however, one frame is composed only of the data frame period.

FIG. 3B illustrates signal waveforms when the camera microcomputer 205 transmits a request command CMD1 to the lens microcomputer 111 and receives two bytes of lens data DT1 (DT1a and DT1b) corresponding to the request command CMD1 from the lens microcomputer 111. FIG. 3B illustrates an example where data communication is executed according to "communication CMD1".

Between the camera microcomputer 205 and the lens microcomputer 111, the types and the numbers of bytes of lens data DT corresponding to a plurality of types of commands CMD are determined in advance. If the camera microcomputer 205 as a communication master transmits a particular command CMD to the lens microcomputer 111, then based on information regarding the number of bytes of lens data corresponding to the command CMD, the lens microcomputer 111 transmits a required clock frequency to the camera microcomputer 205. Further, the processing of the lens microcomputer 111 on the command CMD1 includes the process of superimposing the busy signal on the clock signal LCLK of each frame, and the above busy frames are inserted between data frames.

In the communication CMD1, the camera microcomputer 205 transmits the clock signal LCLK to the lens microcomputer 111 and transmits the request command CMD1 requesting the transmission of the lens data DT1, as the camera data signal DCL to the lens microcomputer 111. The lens data signal DLC of this frame is treated as invalid data.

Next, the camera microcomputer 205 outputs the clock signal LCLK in eight cycles through the clock channel and then switches the clock channel on the camera microcomputer 205 side (the camera main body 200 side) from an output setting to an input setting. If the switching of the clock channel on the camera microcomputer 205 side is completed, the lens microcomputer 111 switches the clock channel on the lens microcomputer 111 side (the interchangeable lens 100 side) from an input setting to an output setting. Then, to notify the camera microcomputer 205 of the waiting-for-communication request BUSY, the lens microcomputer 111 sets the voltage level of the clock channel to low. Consequently, the lens microcomputer 111 superimposes the busy signal on the clock channel. In the period when the camera microcomputer 205 is notified of the waiting-for-communication request BUSY, the camera microcomputer 205 maintains the input setting of the clock channel and stops communicating with the lens microcomputer 111.

In the period when the lens microcomputer 111 notifies the camera microcomputer 205 of the waiting-for-communication request BUSY, the lens microcomputer 111 generates the lens data DT1 corresponding to the transmission request command CMD1. Then, if preparation for transmitting the lens data DT1 as the lens data signal DLC of the next frame is completed, the lens microcomputer 111 switches the signal level of the clock channel on the lens microcomputer 111 side to high and cancels the waiting-for-communication request BUSY.

If recognizing the cancellation of the waiting-for-communication request BUSY, the camera microcomputer 205 transmits the clock signal LCLK of one frame to the lens microcomputer 111, thereby receiving the lens data DT1a from the lens microcomputer 111. In the next frame, the camera microcomputer 205 outputs the clock signal LCLK in eight cycles again, and the camera microcomputer 205 and the lens microcomputer 111 repeat operations similar to the above, whereby the camera microcomputer 205 receives the lens data DT1b from the lens microcomputer 111.

<Communication Method B>

Figure 4:
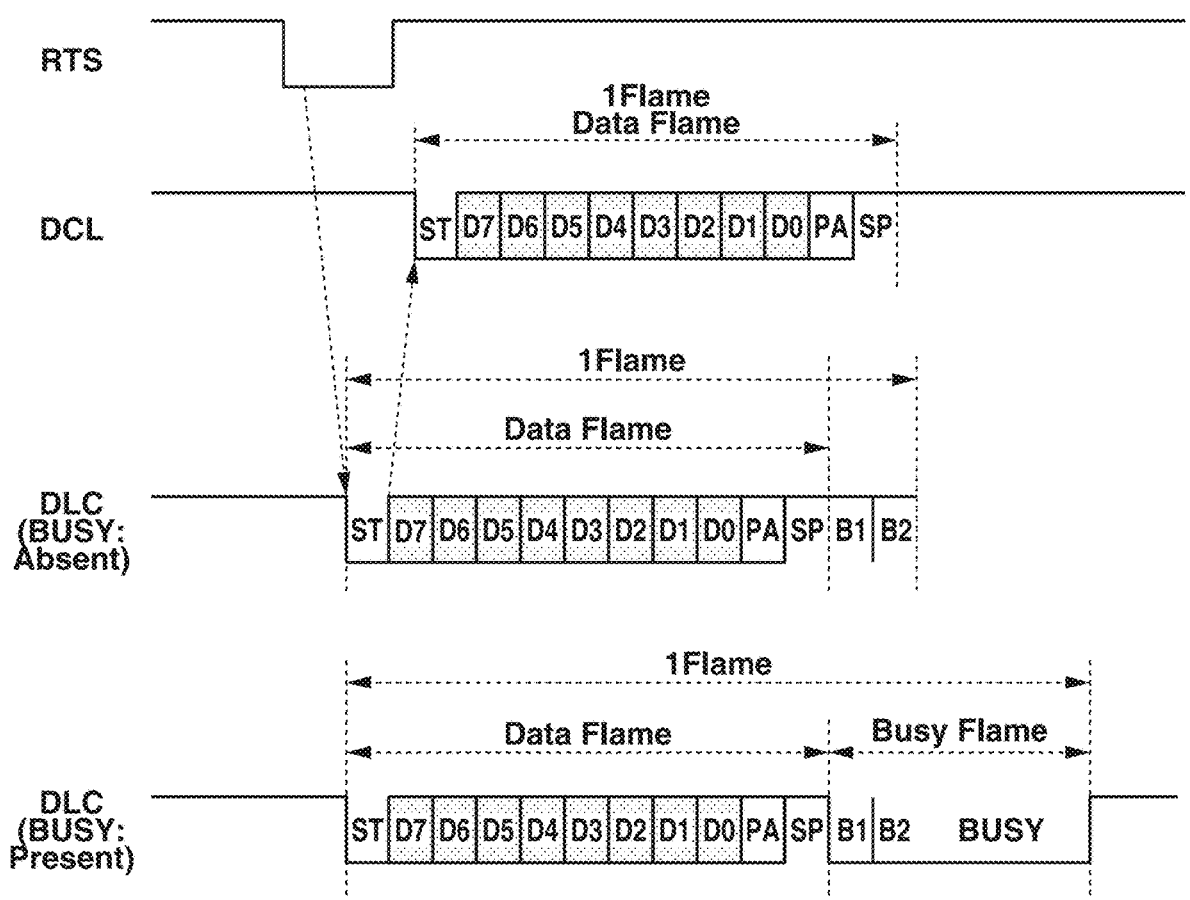
FIG. 4 is a schematic diagram illustrating communication waveforms in a communication mode M2.

Next, communication by the communication method B is described. At the same time, the communication mode M2 for performing communication in the format F1 using the communication method B is also described. FIG. 4 illustrates the waveforms of communication signals exchanged between the camera microcomputer 205 and the lens microcomputer 111 in the communication mode M2. As described above, in the format F1, a busy frame is selectively added to the lens data signal DLC.

In the communication method B, the transmission request channel is used for the camera microcomputer 205 as a communication master to notify the lens microcomputer 111 as a communication slave of a transmission request to transmit lens data. The notification through the transmission request channel is given by switching the level (the voltage level) of a signal through the transmission request channel between high (a first level) and low (a second level). In the following description, the signal supplied to the transmission request channel in the communication method B is referred to as a "transmission request signal RTS".

Similar to the communication method A, a first data communication channel (corresponding to the third communication channel) is used to transmit the lens data signal DLC including various pieces of data from the lens microcomputer 111 to the camera microcomputer 205. Similar to the communication method A, a second data communication channel (corresponding to the second communication channel) is also used to transmit the camera data signal DCL including a control command or a transmission request command from the camera microcomputer 205 to the lens microcomputer 111.

In the communication method B, unlike the communication method A, the camera microcomputer 205 and the lens microcomputer 111 do not transmit and receive data in synchronization with a common clock signal, but set a communication speed in advance and transmit and receive data to and from each other at a communication bit rate based on the setting. The communication bit rate indicates the amount of data that can be transferred in one second, and the unit of the communication bit rate is represented by bits per second (bps).

In the present exemplary embodiment, also in the communication method B, similar to the communication method A, the camera microcomputer 205 and the lens microcomputer 111 communicate with each other by a full-duplex communication method (a full-duplex method) for transmitting and receiving data to and from each other.

FIG. 4 illustrates signal waveforms of one frame, which is the smallest unit of communication. The camera data signal DCL and the lens data signal DLC are partially different in the breakdown of the data format of one frame.

First, the data format of the lens data signal DLC is described. The lens data signal DLC of one frame is composed of a data frame in the first half of the lens data signal DLC and a busy frame following the data frame. In the state where data is not transmitted, the signal level of the lens data signal DLC is kept high.

To notify the camera microcomputer 205 of the start of the transmission of one frame of the lens data signal DLC, the lens microcomputer 111 sets the voltage level of the lens data signal DLC to low in one bit period. The one bit period is referred to as a "start bit ST", and the data frame starts from the start bit ST. Next, the lens microcomputer 111 transmits one byte of lens data in an eight-bit period from the second bit following the start bit ST to the ninth bit.

The bit array of the data starts with the most significant data D7, continues with data D6 and D5, and ends with the least significant data D0 in a most significant bit (MSB) first format. Then, the lens microcomputer 111 adds one bit of parity information (PA) to the tenth bit and sets the voltage level of the lens data signal DLC to high in the period of a stop bit SP indicating the end of the one frame. Consequently, the data frame period starting from the start bit ST ends. The parity information may not need to be one bit. Alternatively, a plurality of bits of parity information may be added. Further, the parity information is not essential. Alternatively, a format may be employed in which the parity information is not added.

Next, as illustrated in "DLC (BUSY: present)" in FIG. 4, the lens microcomputer 111 adds the busy frame after the stop bit SP. Similar to the communication method A, the busy frame indicates the period of the waiting-for-communication request BUSY of which the lens microcomputer 111 notifies the camera microcomputer 205. The lens microcomputer 111 keeps the signal level of the lens data signal DLC low until the waiting-for-communication request BUSY is canceled.

On the other hand, there is a case where the lens microcomputer 111 does not need to notify the camera microcomputer 205 of the waiting-for-communication request BUSY. For this case, as illustrated in "DLC (BUSY: absent)" in FIG. 4, a data format in which one frame is composed without adding the busy frame (hereinafter also referred to as a "busy notification") is also provided. That is, as the data format of the lens data signal DLC, the lens data signal DLC to which the busy notification is added, and the lens data signal DLC to which the busy notification is not added can be selected based on the processing status on the lens microcomputer 111 side.

A description is given of an identification method for identifying the presence or absence of the busy notification by the camera microcomputer 205. A signal waveform illustrated in "DLC (BUSY: absent)" in FIG. 4 and a signal waveform illustrated in "DLC (BUSY: present)" in FIG. 4 include bit positions B1 and B2. The camera microcomputer 205 selects either of the bit positions B1 and B2 as a busy identification position P for identifying the presence or absence of the busy notification. As described above, in the present exemplary embodiment, a data format is employed in which the busy identification position P is selected from the bit positions B1 and B2. Consequently, it is possible to address the issue that the processing time until the busy notification (the lens data signal DLC is low) is finalized after the transmission of the data frame of the lens data signal DLC varies depending on the processing performance of the lens microcomputer 111.

Which of the bit positions B1 and B2 is to be selected as the busy identification position P is determined through communication between the camera microcomputer 205 and the lens microcomputer 111 before the communication by the communication method B is performed. The busy identification position P may not need to be fixed to either of the bit positions B1 and B2, and may be changed depending on the processing capabilities of the camera microcomputer 205 and the lens microcomputer 111. The busy identification position P is not limited to the bit positions B1 and B2, and can be set to a predetermined position after the stop bit SP.

A description is given of the reason for employing a data format in which the busy frame added to the clock signal LCLK in the communication method A is added to the lens data signal DLC in the communication method B.

In the communication method A, the clock signal LCLK output from the camera microcomputer 205 as the communication master and the busy signal output from the lens microcomputer 111 as the communication slave need to be exchanged through the same clock channel. Thus, collision between the outputs of the camera microcomputer 205 and the lens microcomputer 111 is prevented by a time division method. That is, collision between the outputs can be prevented by appropriately assigning the periods when the camera microcomputer 205 and the lens microcomputer 111 are allowed to provide outputs through the clock channel.

In the time division method, however, collision between the outputs of the camera microcomputer 205 and the lens microcomputer 111 needs to be certainly prevented. Thus, between the time when the camera microcomputer 205 completes the output of the clock signal LCLK including eight pulses and the time when the lens microcomputer 111 is permitted to output the busy signal, a certain output prohibition period when both the microcomputers 205 and 111 are prohibited from providing outputs is inserted. The output prohibition period is a communication disabled period when the camera microcomputer 205 and the lens microcomputer 111 cannot communicate with each other. This reduces the effective communication speed.

To resolve such an issue, in the communication method B, a data format is employed in which the busy frame from the lens microcomputer 111 is added to the lens data signal DLC in the first data communication channel, which is a dedicated output channel for the lens microcomputer 111.

Next, the data format of the camera data signal DCL is described. The specifications of a data frame of one frame of the camera data signal DCL are similar to those of the lens data signal DLC. However, unlike the lens data signal DLC, the addition of a busy frame to the camera data signal DCL is prohibited.

Next, the procedure of communication between the camera microcomputer 205 and the lens microcomputer 111 in the communication method B is described. First, if an event for starting communication with the lens microcomputer 111 occurs, the camera microcomputer 205 sets the voltage level of the transmission request signal RTS to low (hereinafter, "asserts the transmission request signal RTS"), thereby notifying the lens microcomputer 111 of a communication request.

If detecting the communication request due to the fact that the voltage level of the transmission request signal RTS changes to low, the lens microcomputer 111 performs a process for generating the lens data signal DLC to be transmitted to the camera microcomputer 205. Then, if preparation for the transmission of the lens data signal DLC is completed, the lens microcomputer 111 starts transmitting the lens data signal DLC of one frame via the first data communication channel. At this time, within a setting time set between the camera microcomputer 205 and the lens microcomputer 111 from the time when the voltage level of the communication request signal RTS changes to low, the lens microcomputer 111 starts transmitting the lens data signal DLC.

That is, in the communication method B, lens data to be transmitted may only need to be finalized between the time when the voltage level of the communication request signal RTS changes to low and the time when the transmission of the lens data signal DLC is started. Unlike the communication method A, there is no strict restriction such as needing to finalize lens data to be transmitted by the time when the first clock pulse is input. Thus, it is possible to flexibly set the timing when the transmission of the lens data signal DLC is started.

Next, according to the detection of a start bit ST added to the beginning of a data frame of the lens data signal DLC received from the lens microcomputer 111, the camera microcomputer 205 changes the voltage level of the transmission request signal RTS back to high (hereinafter, "negates the transmission request signal RTS"). Consequently, the camera microcomputer 205 cancels the transmission request and also starts transmitting the camera data signal DCL through the second communication channel. It does not matter which of the negation of the transmission request signal RTS and the start of the transmission of the camera data signal DCL is performed first. These processes may only need to be performed by the time when the reception of the data frame of the lens data signal DLC is completed.

If the lens microcomputer 111 having transmitted the data frame of the lens data signal DLC needs to notify the camera microcomputer 205 of the waiting-for-communication request BUSY, the lens microcomputer 111 adds a busy frame to the lens data signal DLC. The camera microcomputer 205 monitors the presence or absence of the notification of the waiting-for-communication request BUSY. While the camera microcomputer 205 is notified of the waiting-for-communication request BUSY, the camera microcomputer 205 is prohibited from asserting the transmission request signal RTS for the next transmission request.

The lens microcomputer 111 executes necessary processing in the period when the lens microcomputer 111 keeps the camera microcomputer 205 waiting for communication, using the waiting-for-communication request BUSY. After preparation for the next communication is completed, the lens microcomputer 111 cancels the waiting-for-communication request BUSY. Under the condition that the waiting-for-communication request BUSY is canceled and the transmission of the data frame of the camera data signal DCL is completed, the camera microcomputer 205 is permitted to assert the transmission request signal RTS for the next transmission request.

As described above, in the present exemplary embodiment, according to the fact that the transmission request signal RTS is asserted using a communication start event in the camera microcomputer 205 as a trigger, the lens microcomputer 111 starts transmitting the data frame of the lens data signal DLC to the camera microcomputer 205. Then, according to the detection of the start bit ST of the lens data signal DLC, the camera microcomputer 205 starts transmitting the data frame of the camera data signal DCL to the lens microcomputer 111.

At this time, the lens microcomputer 111 adds a busy frame after the data frame of the lens data signal DLC for the waiting-for-communication request BUSY, where necessary. Then, the lens microcomputer 111 cancels the waiting-for-communication request BUSY, whereby a communication process for communicating one frame is completed. By the communication process, the camera microcomputer 205 and the lens microcomputer 111 transmit and receive one byte of communication data to and from each other.

Next, the communication mode M3 for performing communication in the format F2 using the communication method B is described. FIG. 5A illustrates the waveforms of communication signals exchanged between the camera microcomputer 205 and the lens microcomputer 111 in the communication mode M3. FIG. 5A illustrates the waveforms of communication signals when data of three frames is continuously transmitted. As described above, in the format F2, the addition of the waiting-for-communication request BUSY to the lens data signal DLC is prohibited.

In the data format of the lens data signal DLC in the communication mode M3, one frame is composed only of a data frame, and a busy frame is not present. Thus, in the communication mode M3, the lens microcomputer 111 cannot notify the camera microcomputer 205 of the waiting-for-communication request BUSY.

Such a format F2 is used to perform continuous communication in which the intervals between frames are shortened when a relatively large amount of data is transferred between the camera microcomputer 205 and the lens microcomputer 111. That is, the format F2 enables high-speed communication of a large amount of data.

Next, a description will be given of a communication control process between the camera microcomputer 205 and the lens microcomputer 111, which is the feature of the present exemplary embodiment. FIG. 5B illustrates the waveforms of communication signals when the camera microcomputer 205 and the lens microcomputer 111 continuously transmit and receive the camera data signal DCL and the lens data signal DLC of n frames. If an event for starting communication with the lens microcomputer 111 occurs, the camera microcomputer 205 asserts the transmission request signal RTS. In the format F2, unlike the format F1, the camera microcomputer 205 does not need to negate the transmission request signal RTS with respect to each frame. Thus, during the state where data can be continuously transmitted and received, the camera microcomputer 205 maintains the asserted state of the transmission request signal RTS.

If detecting a communication request due to the assertion of the transmission request signal RTS, the lens microcomputer 111 performs a process for generating the lens data signal DLC to be transmitted to the camera microcomputer 205. Then, if preparation for the transmission of the lens data signal DLC is completed, the lens microcomputer 111 starts transmitting the lens data signal DLC (DL1) of the first frame through the first data communication channel.

The lens microcomputer 111 having transmitted a data frame of the lens data signal DLC of the first frame confirms the transmission request signal RTS again. At this time, if the transmission request signal RTS is in the asserted state, the lens microcomputer 111 transmits the lens data signal DLC (DL2) of the next second frame to the camera microcomputer 205, following the first frame of which the transmission is completed. While the asserted state of the transmission request signal RTS is thus maintained, the lens data signal DLC (DL1 to DLn) from the lens microcomputer 111 is continuously transmitted to the camera microcomputer 205. Then, if the transmission of the lens data signal DLC of the n frames determined in advance is completed, the transmission of the lens data signal DLC is stopped.

According to the detection of a start bit ST of each frame of the lens data signal DLC from the lens microcomputer 111, the camera microcomputer 205 starts transmitting the camera data signal DCL (DC1 to DCn) of the n frames through the second communication channel.

FIG. 5C illustrates the waveforms of communication signals in a case where the camera microcomputer 205 or the lens microcomputer 111 gives an instruction to temporarily wait for communication during the communication of the continuous transmission and reception of data illustrated in FIG. 5B. Also in this case, the camera microcomputer 205 asserts the communication request signal RTS, whereby the lens microcomputer 111 starts transmitting the lens data signal DLC. Then, according to the detection of a start bit ST of the lens data signal DLC, the camera microcomputer 205 starts transmitting the camera data signal DCL.

A waiting-for-communication period T2w1 indicates the period when the camera microcomputer 205 gives an instruction to wait for communication. The camera microcomputer 205 temporarily negates the transmission request signal RTS, thereby notifying the lens microcomputer 111 of this instruction. If detecting the negation of the transmission request signal RTS, the lens microcomputer 111 completes the transmission of a frame (DL6 in FIG. 5C: hereinafter referred to as a "suspension frame") of the lens data signal DLC that is being transmitted when the negation is detected. Then, the lens microcomputer 111 suspends the transmission.

In response to the suspension of the transmission of the lens data signal DLC, the camera microcomputer 205 also transmits a frame (DC6) corresponding to the suspension frame in the camera data signal DCL and then suspends the transmission of the camera data signal DCL. By such communication control, even in a case where a waiting-for-communication instruction is given during the communication of the continuous transmission and reception of data, it is possible to manage the lens data signal DLC and the camera data signal DCL so that the numbers of transmitted frames of the lens data signal DLC and the camera data signal DCL are the same.

If a waiting-for-communication request event is not present, the camera microcomputer 205 asserts the transmission request signal RTS again and thereby can instruct the lens microcomputer 111 to resume the communication. In response to the communication resumption instruction, the lens microcomputer 111 resumes the transmission of the lens data signal DLC from a frame (DL7: hereinafter referred to as a "resumption frame") following the suspension frame. Then, according to the detection of a start bit ST of the resumption frame, the camera microcomputer 205 resumes the transmission of a frame (DC7) corresponding to the resumption frame in the camera data signal DCL.

On the other hand, a waiting-for-communication period T$2w2$ indicates the period when the lens microcomputer 111 gives an instruction to wait for communication. In FIG. 5C, after the waiting-for-communication period T$2w1$ ends, neither the camera microcomputer 205 nor the lens microcomputer 111 gives an instruction to wait for communication, and the camera microcomputer 205 and the lens microcomputer 111 continuously transmit and receive data to and from each other in the order of the resumption frames DL7 and DC7, frames DL8 and DC8 following the resumption frames DL7 and DC7, and frames DL9 and DC9.

Then, when the transmission of the frame DL9 from the lens microcomputer 111 (the reception of the frame DC9 from the camera microcomputer 205) is completed, a waiting-for-communication request event occurs, whereby the lens microcomputer 111 notifies the camera microcomputer 205 of a waiting-for-communication instruction.

When the transmission request signal RTS is in an asserted state, the lens microcomputer 111 does not transmit the lens data signal DLC, thereby notifying the camera microcomputer 205 that the communication is to be suspended.

The camera microcomputer 205 constantly monitors a start bit ST of each frame of the lens data signal DLC. A rule is made that if the camera microcomputer 205 does not detect the start bit ST, the camera microcomputer 205 suspends the transmission of the next frame of the camera data signal DCL. Even if the transmission request signal RTS is asserted, but if the camera microcomputer 205 does not receive the lens data signal DLC (DL10 in FIG. 5C) from the lens microcomputer 111, the camera microcomputer 205 suspends the communication without transmitting the camera data signal DCL (DC10). The camera microcomputer 205 keeps the transmission request signal RTS in the asserted state during the waiting-for-communication period T$2w2$ when the lens microcomputer 111 gives an instruction.

Then, a waiting-for-communication request event is not present in the lens microcomputer 111, and the lens microcomputer 111 resumes the transmission of the resumption frame DL10 in the lens data signal DLC. According to the detection of the start bit ST of the resumption frame DL10, the camera microcomputer 205 resumes the transmission of the corresponding frame DC10 in the camera data signal DCL.

Figure 6:
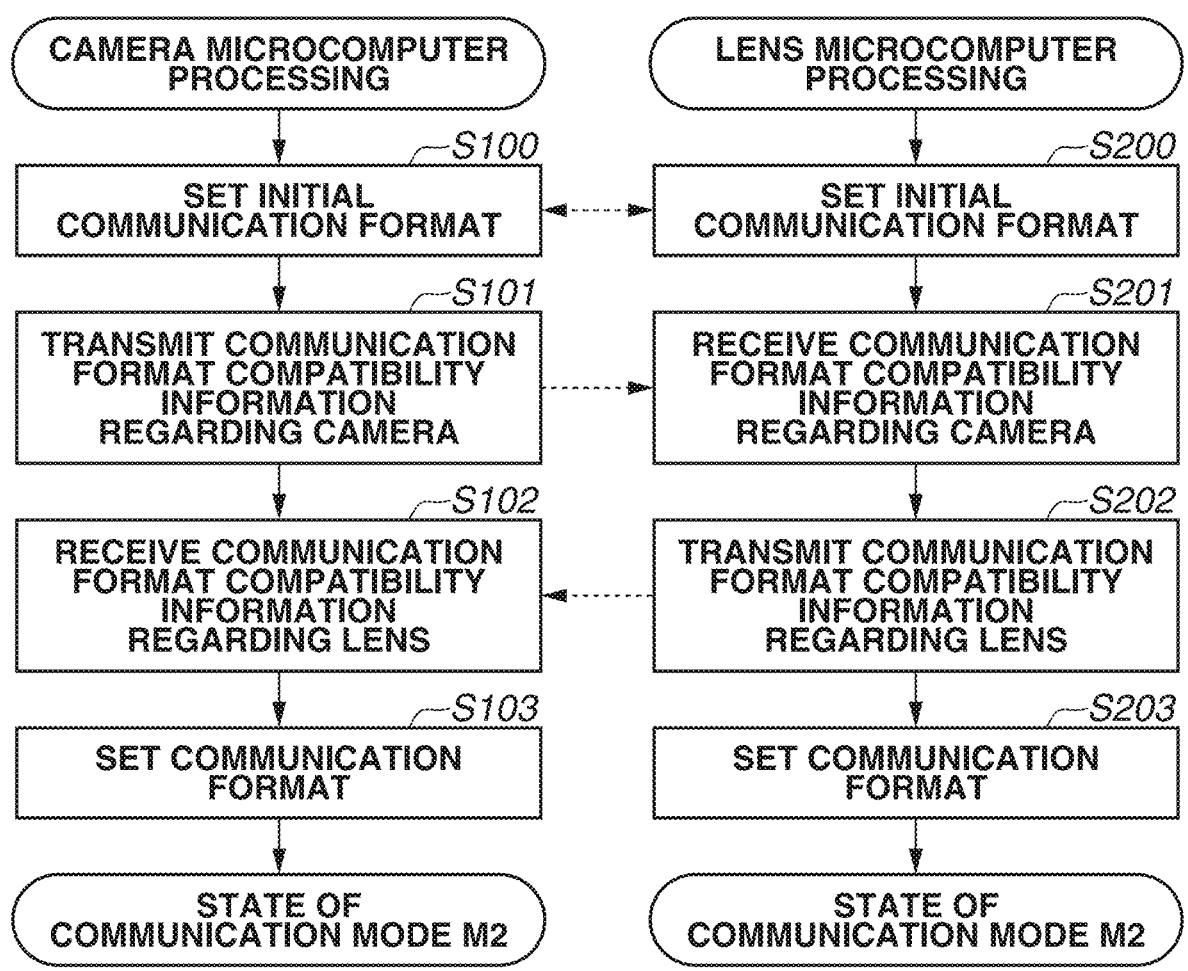
FIG. 6 is a flowchart illustrating a flow in which a communication format is determined in the accessory device and the imaging apparatus.
Figure 7:
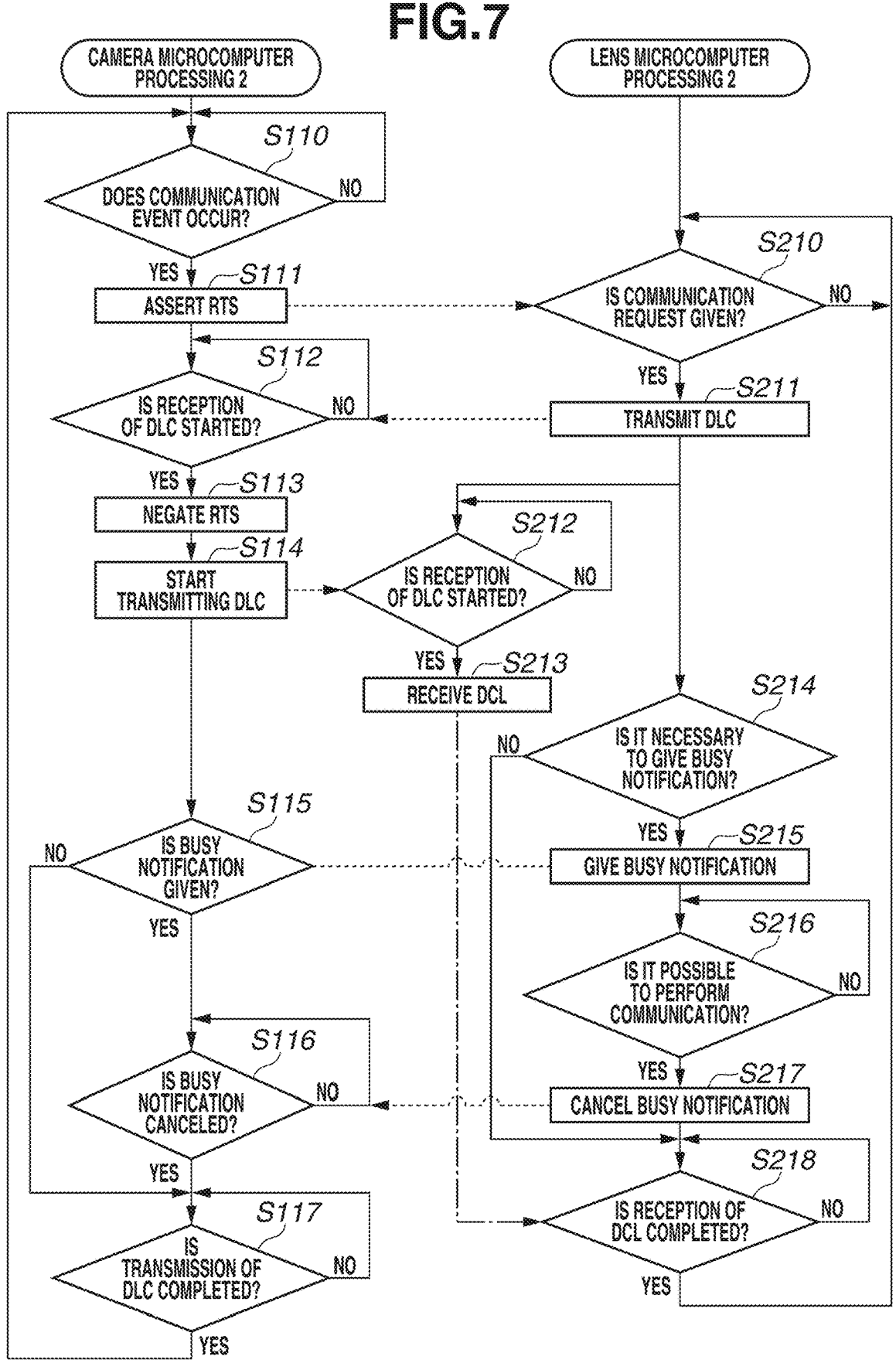
FIG. 7 is a flowchart illustrating a data communication flow in the communication mode M2.

Next, with reference to FIG. 6, a description will be given of a procedure for determining a communication format between the camera microcomputer 205 and the lens microcomputer 111. based on a communication control program, which is a computer program, the camera microcomputer 205 and the lens microcomputer 111 perform communication control illustrated in flowcharts in FIGS. 6 and 7.

First, if the interchangeable lens 100 is attached to the camera main body 200, then in steps S100 and S200, the camera microcomputer 205 and the lens microcomputer 111 set as a communication format an initial communication format in which the establishment of communication is guaranteed. At this time, the initial communication format may be the combination of a communication method and a data format discussed in the present exemplary embodiment, or may be a communication format other than the combination of a communication method and a data format discussed in the present exemplary embodiment. When an asynchronous communication format is selected as the initial communication format, it is desirable to set the busy identification position P such that communication can be executed no matter what camera and interchangeable lens are combined together.

Next, in step S101, the camera microcomputer 205 transmits, to the lens microcomputer 111, camera identification information indicating a communication format with which the camera main body 200 is compatible. Further, in step S202, the lens microcomputer 111 transmits, to the camera microcomputer 205, lens identification information indicating a communication format with which the interchangeable lens 100 is compatible.

At this time, the "identification information" includes information indicating with which of the clock synchronization communication method and the asynchronous communication method the camera main body 200 and the interchangeable lens 100 are compatible, and information indicating the range of a communication bit rate with which the camera main body 200 and the interchangeable lens 100 each are compatible. The identification information also includes information indicating the busy identification position P.

In step S102, the camera microcomputer 205 receives the lens identification information. In step S201, the lens microcomputer 111 receives the camera identification information. In the flowchart in FIG. 6, after the camera identification information is transmitted, the lens identification information is transmitted. Alternatively, the transmission of the camera identification information and the transmission of the lens identification information may be simultaneously performed. Yet alternatively, after the lens identification information is transmitted, the camera identification information may be transmitted.

Next, in steps S103 and S203, a communication format for the subsequent communication is set. Specifically, the camera microcomputer 205 and the lens microcomputer 111 determine as a communication bit rate the fastest rate among communication bit rates with which the camera microcomputer 205 and the lens microcomputer 111 are compatible. Further, the camera microcomputer 205 and the lens microcomputer 111 set as the busy identification position P the closest position to a stop bit SP among busy identification positions P with which the camera microcomputer 205 and the lens microcomputer 111 are compatible.

Through the above communication control, the communication mode of the camera microcomputer 205 and the lens microcomputer 111 shifts to the state of the communication mode M2.

<Data Communication Flow in Asynchronous Communication Method>

Next, with reference to FIG. 7, a data communication flow in the asynchronous communication method will be described. With reference to FIG. 7, a description is given of a communication flow in a data format in which the addition of the busy signal is permitted.

The camera microcomputer 205 monitors whether a communication event for starting communication with the lens microcomputer 111 occurs. If a communication event occurs in step S110 (Yes in step S110), the processing proceeds to step S111. In step S111, as described above, the camera microcomputer 205 asserts the communication request signal RTS, thereby making a communication request to the lens microcomputer 111.

The lens microcomputer 111 monitors whether the communication request signal RTS is asserted. If the lens microcomputer 111 recognizes in step S210 that the communication request signal RTS is asserted (Yes in step S210), the processing proceeds to step S211. In step S211, the lens microcomputer 111 transmits the lens data signal DLC to the camera microcomputer 205 via the first data communication channel.

If the camera microcomputer 205 receives the lens data signal DLC from the lens microcomputer 111 (YES in step S112), the processing proceeds to step S113. In step S113, the camera microcomputer 205 negates the communication request signal RTS. Then, the processing proceeds to step S114. In step S114, the camera microcomputer 205 transmits the camera data signal DCL to the lens microcomputer 111 via the second data communication channel.

If the lens microcomputer 111 detects the start of the reception of the camera data signal DCL in step S212 (Yes in step S212), the processing proceeds to step S213. In step S213, the lens microcomputer 111 performs a process for receiving the camera data signal DCL. In step S214, in parallel with the process of step S213, the lens microcomputer 111 determines whether the lens microcomputer 111 needs to notify the camera microcomputer 205 of the waiting-for-communication request BUSY. If the lens microcomputer 111 does not need to notify the camera microcomputer 205 of the waiting-for-communication request BUSY (No in step S214), the processing proceeds to step S218. In step S218, the lens microcomputer 111 waits until the reception of the camera data signal DCL is completed.

If, on the other hand, the lens microcomputer 111 needs to notify the camera microcomputer 205 of the waiting-for-communication request BUSY (Yes in step S214), the processing proceeds to step S215. In step S215, the lens microcomputer 111 adds a busy frame to the lens data signal DLC. While notifying the camera microcomputer 205 of the waiting-for-communication request BUSY, the lens microcomputer 111 executes necessary processing. After preparation for the next communication is completed (Yes in step S216), then in step S217, the lens microcomputer 111 cancels the waiting-for-communication request BUSY. After the lens microcomputer 111 cancels the waiting-for-communication request BUSY, the processing proceeds to step S218. In step S218, the lens microcomputer 111 waits until the reception of the camera data signal DCL is completed. If the reception of the camera data signal DCL is completed (Yes in step S218), the processing returns to step S210. In step S210, the lens microcomputer 111 continues to monitor whether the communication request signal RTS is asserted.

If receiving the notification of the waiting-for-communication request BUSY in step S115 (Yes in step S115), the camera microcomputer 205 waits until the waiting-for-communication request BUSY is canceled. If the waiting-for-communication request BUSY is canceled (YES in step S116), the processing proceeds to step S117. In step S117, the camera microcomputer 205 determines whether the transmission of the camera data signal DCL is completed. Further, also if the notification of the waiting-for-communication request BUSY is not received in step S115 (No in step S115), the processing proceeds to step S117. In step S117, the camera microcomputer 205 determines whether the transmission of the camera data signal DCL is completed. If it is determined in step S117 that the transmission of the camera data signal DCL is completed (Yes in step S117), the processing returns to step S110. In step S110, the camera microcomputer 205 continues to monitor whether a communication event occurs.

As described above, the present exemplary embodiment relates to communication control in asynchronous communication (the communication method B) composed of three channels. Via the first data communication channel, which is a dedicated output channel for the lens microcomputer 111, the lens microcomputer 111 transmits the waiting-for-communication request BUSY to the camera microcomputer 205. On the other hand, the transmission request signal RTS from the camera microcomputer 205 is transmitted from the camera microcomputer 205 to the lens microcomputer 111 via a notification channel, which is a dedicated output channel for the camera microcomputer 205.

As described above, the waiting-for-communication request BUSY from the lens microcomputer 111 is transmitted and received via the dedicated output channel for the lens microcomputer 111, and the transmission request signal RTS from the camera microcomputer 205 is transmitted and received via the dedicated output channel for the camera microcomputer 205. This can shorten the communication disabled period between the camera microcomputer 205 and the lens microcomputer 111. As a result, it is possible to increase the effective communication speed.

Regarding the start timing of communication, the transmission of data from the lens microcomputer 111 to the camera microcomputer 205 is started first. According to the detection of a start bit ST of a data frame transmitted from the lens microcomputer 111, the camera microcomputer 205 starts transmitting data. The start timing of communication is thus set, whereby it is possible to flexibly set the timing when the lens microcomputer 111 having received the transmission request signal RTS starts transmitting data to the camera microcomputer 205.

For example, depending on the information processing capability of the lens microcomputer 111, it is possible to change the start timing of the transmission of data. This can improve the communication speed between the camera main body 200 and the interchangeable lens 100 without causing the breakdown of communication.

<Issue Assumed in Present Exemplary Embodiment>

An issue assumed in the present exemplary embodiment is described.

If an attempt is made to display indices of distance information without taking into account the differences in specs between interchangeable lenses such as a wide angle lens and a telephoto lens, or the differences in specs between cameras, in specs such as the numbers of pixels of display members of the cameras, an issue arises in the following situation.

Figure 19A:
FIGS. 19A and 19B are diagrams illustrating an issue.

FIG. 19A illustrates representative index positions on a distance bar transmitted from the lens microcomputer 111 to the camera microcomputer 205. More specifically, FIG. 19A illustrates a case where the display position of each index position is specified by the number of pixels. Positions 2001 to 2007 indicate start positions where representative indices "0.45 m", "0.6 m", "0.8 m", "1 m", "1.5 m", "3 m", and "5 m" are displayed.

A position 2008 indicates a display origin position, and the display start position of "0.45 m" is indicated by the number of pixels counted from the display origin 2008, such as "30 pixels". Similarly, the display start position of "0.6 m" is indicated by the number of pixels counted from the display origin 2008, such as "150 pixels".

In this method, to effectively utilize the entire length of the distance bar, the lens microcomputer 111 of the interchangeable lens 100 needs to grasp in advance the number of pixels of the entire length of a display member of a camera to which the interchangeable lens 100 is attachable.

Figure 19B:
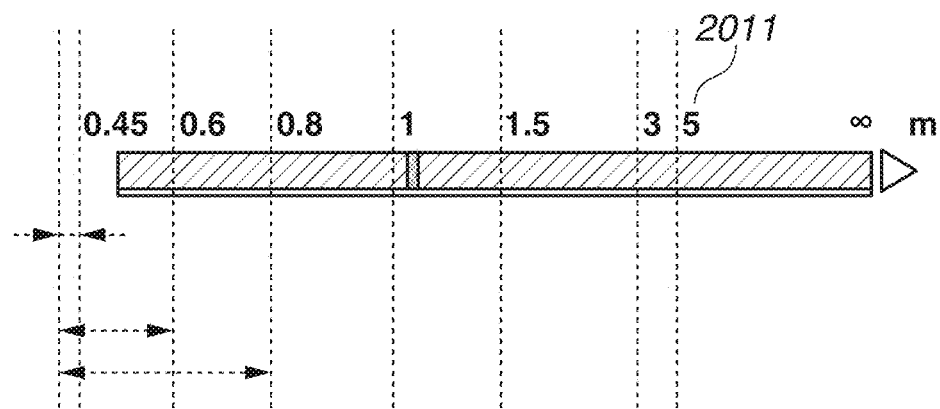

Further, if similar information is exchanged when the number of effective pixels of the display member of the camera increases, then as illustrated in FIG. 19B, the index positions are displayed closer to each other than in FIG. 19A. In this case, there is a possibility that it is difficult to recognize the boundary between "3 m" and "5 m" as illustrated at a position 2011, and "3 m" and "5 m" are erroneously recognized as "35 m".

To resolve such an issue, a technique is possible in which specs such as the number of effective pixels of the display member of the camera are transmitted to the lens, and the lens transmits object distance information and representative index positions to the camera based on the number of effective pixels of the display member of the camera. However, since the number of effective pixels of a camera to be released later than the lens product cannot be known in advance, it is difficult to guarantee compatibility. Further, even if there is a wide variety of items to be displayed at the display unit of the camera, such as the object distance information, representative index values, macro magnification information, and focusing range information, it is necessary to prevent the items from influencing driving control of the focus, the diaphragm, and the image stabilization. Further, if delay occurs also in the communication of information for display, this causes delay in the display and therefore reduces usability. Thus, it is necessary to reduce the amount of communication regarding the communication of information for display.

In the present exemplary embodiment, not only does the lens microcomputer 111 transmit appropriate information to the camera microcomputer 205 based on the specs of the lens 100, but also the lens microcomputer 111 transmits a normalized value to the camera microcomputer 205, where necessary. Consequently, it is possible to appropriately display information corresponding to the interchangeable lens 100 at the camera display unit 206.

<Example of Display Screen Regarding Object Distance Information on Distance Bar>

Next, with reference to FIG. 8, a description will be given of an example of a display screen of distance bar information on which object distance information regarding the lens 100 according to the present exemplary embodiment is displayed at the camera display unit 206.

A live view display screen 801 is displayed at the camera display unit 206.

An icon 802 indicates image capturing mode information regarding the camera set in the menu of the camera. In this example, the image capturing mode information indicates a shutter speed priority mode.

Information display 803 relates to image capturing, such as the shutter speed, the aperture value, the exposure setting value, and the International Organization for Standardization (ISO) sensitivity, as various pieces of setting information in the current imaging condition.

An object 804 indicates an object when an image is captured. In the state where the object 804 is in focus, position information regarding the focus lens 104 is communicated as object distance information from the lens microcomputer 111 to the camera microcomputer 205.

A distance bar 805 represents a distance area where an image can be captured as the spec of the interchangeable lens 100, from the focus closest side to the focus infinity side.

Values 806 are representative index values of distance information for facilitating visual confirmation of the current object distance information and are represented as, for example, "0.45 m", "1.5 m", and "5 m". Such an index regarding the object distance is also referred to as a "first index". The display positions of these representative index values, the number of representative index values to be displayed, and the display intervals between representative index values are changed based on the specs (a wide angle lens or a telephoto lens) of the interchangeable lens 100, whereby it is possible to obtain optimal display quality.

A focus infinity position icon 807 indicates that the focus distance is infinity. The focus infinity position icon 807 is also referred to as a "second index". Generally, the interchangeable lens 100 is designed such that the focus lens position where a distant view is in focus is not at the infinity side end of the physical range of movement of the focus lens 104, and allowance is provided beyond the infinity side end. The amount of the allowance varies depending on the optical design of the interchangeable lens 100. In the present exemplary embodiment, the allowance is referred to as an "over-infinity range". The area from the display position of the infinity icon 807 to the right end of the bar 805 indicates the over-infinity range. As described above, the amount of the over-infinity range varies depending on the model of the interchangeable lens 100. Thus, the display position of the infinity icon 807 changes based on the model of the interchangeable lens 100 to be attached.

An icon 808 indicates the unit system of the currently displayed object distance information. For example, "m" indicates a meter, and "ft" represents a foot.

An index 809 indicates current position information regarding the focus lens 104, i.e., the object distance information in the state where the focus lens 104 is in focus. In FIG. 8, the current position of the focus lens 104 is present near the index position of "1.5 m". Thus, it is possible to visually confirm that the focus distance is about 1.5 m.

A focus limit area 810 indicates an area where focus driving is limited in a case where the focus limit switch 141 included in the interchangeable lens 100 is enabled. The focus limit area 810 illustrates an example where the focus limit switch 141 is switched to "0.8 m to ∞". This represents that this area "closest to 0.8 m" is not used in autofocus. Generally, some interchangeable lens 100 includes a focus limiter SW that enables switching of the focus distance range of autofocus. However, an area to be limited varies depending on the model of the interchangeable lens 100. Thus, the focus limit area 810 can be switched by acquiring the focus limit area 810 from the lens microcomputer 111 based on the model and the switch state of the lens 100 to be attached.

Icons 811 and 812 indicate the driving direction of the focus lens 104. In a case where the focus is driven in the infinity direction, the icon 811 is displayed, and the icon 812 is hidden. In a case where the focus is driven in the closest direction, the icon 811 is hidden, and the icon 812 is displayed.

Depending on the interchangeable lens, the user can store in advance a certain focus lens position in a lens microcomputer included in the interchangeable lens. For example, the user can operate a focus ring to a certain position of the focus ring corresponding to a desired focus lens position and store information corresponding to the focus lens position. Then, for example, by operating an operation member provided in the interchangeable lens, the user can perform regeneration driving of the focus lens to the stored focus lens position. The display screen 801 may indicate that the regeneration driving is being performed. For example, the icon 811 or 812 may be displayed, thereby indicating that the focus lens 104 is being driven, and letting the user know that regeneration driving is being performed. Further, for example, an icon (not illustrated) different from the icons 811 and 812 may be displayed. At this time, the information to be stored in the lens microcomputer may only need to be information corresponding to the focus lens position set in advance, and for example, the position of the focus ring may be stored.

An arrow 813 indicates the position where the representative index position of "0.6 m" is placed on the distance bar. The position information is acquired from the lens microcomputer 111 through communication and represented as a placement position of which the starting point is the left end (i.e., the closest end) of the distance bar when the entire length of the distance bar is 100. For example, to place the representative index position of "0.6 m" at a position of 10% from the left end of the distance bar relative to the entire length of the distance bar, information indicating that the index "0.6 m" is placed at a normalized position "10" is acquired from the lens microcomputer 111. Although illustrated in the diagram for convenience of description, the arrow 813 is not displayed on the actual live view screen 801. Similarly, arrows 814 and 815 are not displayed on the live view screen 801, either.

Similar to the arrow 813, the arrow 814 indicates position information regarding the current object distance position on the distance bar normalized with respect to the entire length of the distance bar 805 that can be displayed at the camera display unit 206.

Similar to the arrow 813, the arrow 815 indicates position information regarding the focus limit switch position on the distance bar normalized with respect to the entire length of the distance bar 805 that can be displayed at the camera display unit 206.

<Regarding Examples of Display Screen Regarding Macro Magnification Information and Depth-of-Field Information on Distance Bar>

Figure 8:
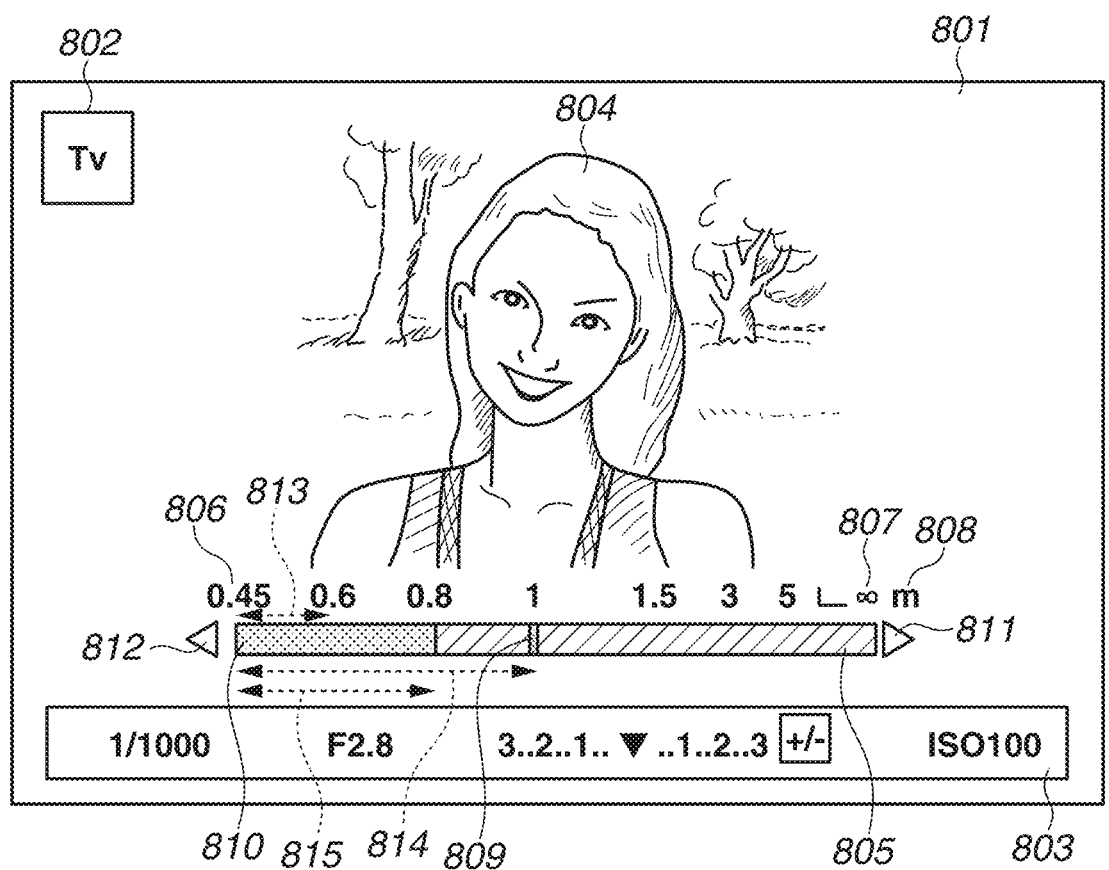
FIG. 8 is a schematic screen diagram illustrating focus distance bar information displayed in the imaging apparatus.

While FIG. 8 illustrates an example where the object distance information is displayed, then next, FIG. 9 illustrates examples of display in a case where information other than the object distance information, such as the macro magnification information and the depth-of-field information, is displayed.

A state 901 illustrates the state where the macro magnification information is displayed in addition to the object distance information. Also in the magnification information, similar to the distance information, representative index values and representative index positions are appropriately placed such that it is easy for the user to visually confirm the representative index values and the representative index positions depending on the specs of the interchangeable lens 100. For example, an icon 902 indicates the position of a macro magnification of 1.2 times. Based on position information normalized as the position where "1.2×" is displayed as display information acquired from the interchangeable lens 100 on the distance bar, "1.2×" is placed at a position of "3". Further, "0.7×" is placed at a position of "30" as a normalized position. The camera microcomputer 205 acquires such information from the lens microcomputer 111 and displays the information at the display unit 206.

A state 903 illustrates an example where the depth-of-field information indicating an area in focus is displayed in addition to the current object distance information. The depth of field changes based on the aperture state. The smaller the aperture, the wider the depth of field. The depth of field is determined based on permissible-circle-of-confusion information as the amount of blur, which is a reference about whether the lens is in focus, and the aperture diameter. Thus, the camera microcomputer 205 acquires the depth-of-field information from the current aperture diameter information acquired from the lens microcomputer 111 and calculates the depth. For example, the camera microcomputer 205 calculates an area in focus in a case where the aperture is set to F8 or F22. An index 809 is the current object distance information. An index 904 is an index position indicating the depth-of-field area in a case where the aperture value is set to F8.0. On the distance bar, an icon 905 indicates that this index position is the depth-of-field position when the aperture value is set to F8.0. Then, a range 906 indicates the depth-of-field area when the aperture value is set to F8.0. Similarly, an index 907 is an index position indicating the depth-of-field area in a case where the aperture value is set to F22. On the distance bar, an icon 908 indicates that this index position is the depth-of-field position when the aperture value is set to F22. Then, a range 909 indicates the depth-of-field area when the aperture value is set to F22.

<Start Process>

Next, with reference to flowcharts for a camera start process in FIG. 10, a steady operation process in FIG. 11A, and a display update process in FIG. 11B, a description will be given of the process of transmitting the display information described with reference to FIGS. 8 and 9 from the interchangeable lens 100 to the camera main body 200 and displaying the display information at the camera main body 200. First, with reference to FIG. 10, the camera start process will be described below regarding both the processing of the camera microcomputer 205 and the processing of the lens microcomputer 111.

In steps S1001 and S1021, a negotiation communication process between the camera main body 200 and the interchangeable lens 100 is performed. As the negotiation communication, the camera main body 200 transmits, to the interchangeable lens 100, information regarding what functions the camera main body 200 is compatible with. Conversely, the interchangeable lens 100 transmits, to the camera main body 200, function information regarding functions included in the interchangeable lens 100. More specifically, the function information is, for example, information regarding whether the interchangeable lens 100 has an image stabilization function, or information regarding whether the interchangeable lens 100 is compatible with the communication modes M2 and M3 described with reference to FIGS. 4, 5A, 5B, and 5C.

In step S1002, the camera microcomputer 205 determines whether, as a result of the communication process in steps S1001 and S1021, communication in the communication mode M2 can be performed by the combination of the camera microcomputer 205 and the interchangeable lens 100 currently attached to the camera microcomputer 205. In the present exemplary embodiment, if communication in the communication mode M2 cannot be performed, a process for displaying the object distance information in the camera is not performed. Thus, the camera microcomputer 205 shifts to a steady state. This is because the effective communication rate is higher in the communication mode M2 than in the communication mode M1, and therefore, there is room in the communication band so long as the communication mode M2 is selected. However, even if the combination of the camera microcomputer 205 and the interchangeable lens 100 is incompatible with the communication mode M2 and the communication mode M1 is selected, the process for displaying the object distance information in the camera may be performed by devising a method such as thinning the communication frequency based on the room in the communication band. If it is determined that communication in the communication mode M2 can be performed (Yes in step S1002), then in steps S1003 and S1022, a process for switching to the communication mode M2 is performed. The switching process is performed by the method described above with reference to FIG. 6.

The process will be described below in which the camera main body 200 acquires information for displaying the object distance information from the interchangeable lens 100 through communication. Terms are defined as follows. Information that is finalized when the interchangeable lens 100 is attached to the camera main body 200 (e.g., the focal length at the telephoto end and the wide-angle end and the representative index positions of the object distance information) is referred to as "static display information". The static display information is information that does not change depending on the states of the camera main body 200 and the interchangeable lens 100, such as operations on the camera and the lens and the image capturing mode. On the other hand, display information that dynamically changes depending on the operation of the camera 200, such as the position of the focus, is referred to as "dynamic display information". The dynamic display information is information that changes depending on the states of the camera main body 200 and the interchangeable lens 100, such as operations on the camera and the lens and the image capturing mode. The static display information is also referred to as "first information". The dynamic display information is also referred to as "second information".

In step S1004, the camera microcomputer 205 requests from the interchangeable lens 100 the data size of the static display information that is required to display the object distance information. A description is given of the static display information that is required to display the object distance information.

The static display information for displaying the object distance information at the display unit 206 of the camera includes information corresponding to the presence or absence of an operation member of the interchangeable lens 100, and information regarding the display of indices. Specifically, the static display information according to the present exemplary embodiment is, for example, the following parameters 1 to 12.

The Information Corresponding to the Presence or Absence of an Operation Member
1. the presence or absence of a selection switch for switching to a macro imaging state
2. the presence or absence of a focus limit switch The Information Regarding the Display of Indices
3. the number of representative index positions represented in meters
4. the numerical values of representative indices represented in meters (as many as the number of representative index positions)
5. normalized placement position information regarding representative indices on the distance bar represented in meters (as many as the number of representative index positions)
6. the number of representative index positions represented in feet
7. the numerical values of representative indices represented in feet (as many as the number of representative index positions)
8. normalized placement position information regarding representative indices on the distance bar represented in feet (as many as the number of representative index positions)
9. the number of representative index positions represented by macro magnification
10. the numerical values of representative indices represented by macro magnification (as many as the number of representative index positions)
11. normalized placement position information regarding representative indices on the distance bar represented by macro magnification (as many as the number of representative index positions)
12. normalized placement position information regarding an "∞" mark on the distance bar The static display information is described using the example of display in FIG. 8.

First, "the information corresponding to the presence or absence of an operation member" is described. The information is information used to indicate that the interchangeable lens 100 has a function corresponding to an operation member. Thus, another piece of information can also be used instead of the information so long as the information corresponds to the presence or absence of a function regarding display. That is, for example, the information "1. the presence or absence of a selection switch for switching to a macro imaging state" may only need to be information indicating that the interchangeable lens 100 enables switching to a macro imaging state. Further, "2. the presence or absence of a focus limit switch" may only need to be information indicating that the interchangeable lens 100 has the function of limiting the range where the focus lens 104 is moved.

Regarding "1. the presence or absence of a selection switch for switching to a macro imaging state", there is an interchangeable lens product that switches to a macro imaging mode by, as an operation on a lens barrel, e.g., operating a switch (not illustrated) in the barrel while hitting a zoom ring against the switch. This item indicates whether the interchangeable lens 100 includes such a selection switch for switching to a macro imaging state. In this proposal, when macro imaging is performed, the imaging magnification is displayed at the display unit 206 of the camera. Thus, the display content can be switched by operating the switch. If the static display information indicates that the switch is not present, communication control may be performed not to acquire display information when macro imaging is performed.

Regarding "2. the presence or absence of a focus limit switch", there is an interchangeable lens product including in a lens barrel a focus limit switch for limiting the distance range where the lens can be brought into focus. In this proposal, the limit state of the focus limit switch is displayed at the display unit 206 of the camera. If the static display information indicates that the switch is not present, communication control may be performed not to acquire display information regarding the index position of the focus limit switch.

In the example of FIG. 8, since seven representative index positions, i.e., "0.45 m", "0.6 m", "0.8 m", "1 m", "1.5 m", "3 m", and "5 m", are placed, the parameter "3. the number of representative index positions represented in meters" is "7".

As will be described below with reference to FIG. 10, the information regarding the above terms 1 to 12 is collectively acquired when the lens 100 is attached. At this time, if the number of representative index values is a fixed value, and if the number of representative index values is not the maximum number, it is necessary to provide blank in the communication content. On the other hand, the number of representative index positions is included in the communication content as described above. Thus, the camera having received this information analyzes the order of pieces of reception data based on the number of representative index positions, thereby extracting the information regarding the terms 1 to 12. This eliminates the need to perform communication leading to unnecessary blank. More specifically, if the parameter "3. the number of representative index positions represented in meters" is "7", reception data is received in the following order.

The first byte: the presence or absence of a selection switch for switching to a macro imaging state The second byte: the presence or absence of a focus limit switch The third byte: the number of representative index positions represented in meters The fourth to tenth bytes: the numerical values of representative indices represented in meters (in a case where a single index value is represented in one byte)

The eleventh to seventeenth bytes: normalized placement position information regarding representative indices on the distance bar represented in meters (in a case where a single index value is represented in one byte)

The number of representative index positions is thus included in the communication content, whereby it is possible to communicate pieces of data without intervals.

"4. the numerical values of representative indices represented in meters (as many as the number of representative index positions)" are "0.45", "0.6", "0.8", "1", "1.5", "3", and "5".

Then, regarding "5. normalized placement position information regarding representative indices on the distance bar represented in meters (as many as the number of representative index positions)", values normalized with respect to a predetermined range (length) of the distance bar (an example of a display area) displayed at the display unit 206 are communicated. The lens microcomputer 111 has information regarding where on the distance bar the representative index positions are to be placed. For example, as information regarding where on the distance bar the representative index position of "0.6 m" is to be placed, a value normalized when the entire length of the distance bar is 100 is communicated. The predetermined range (length) as a reference may be defined in advance by the camera microcomputer 205 and the lens microcomputer 111, or may be acquired through communication. "0.45 m" is placed at a position of "3" as a normalized value from the closest end. "0.6 m" is placed at a position of "15" as a normalized value from the closest end. As the length of the arrow 813 represented in FIG. 8, a value of "15" is set to the parameter.

This display position information can be determined from the viewpoint of the specs and the design of the interchangeable lens 100. For example, to display the index "0.45 m" as the imaging-possible distance (the shortest focus distance) of the interchangeable lens 100 and display the index "5 m" before the "∞" mark on the infinity side, then based on how much display space the user wishes to provide further on the closest side than "0.45 m" and between "5 m" and the "∞" mark as a design in addition to a portion between "0.45 m" to "5 m", position information regarding the index values can be determined within a normalized value of 100.

Also in the cases of the foot representation and the macro magnification representation, the index values are similarly communicated as normalized values.

If attention is paid to 3, 4, and 5, "3. the number of representative index positions represented in meters" is information corresponding to the number of indices. Further, "4. the numerical values of representative indices represented in meters (as many as the number of representative index positions)" are pieces of information corresponding to numerical values to be displayed corresponding to as many indices as the number indicated by the information corresponding to the number of indices. Furthermore, "5. normalized placement position information regarding representative indices on the distance bar represented in meters (as many as the number of representative index positions)" is information corresponding to the positions where the pieces of information corresponding to the numerical values are displayed. As described above, information corresponding to the number of indices, pieces of information corresponding to numerical values to be displayed corresponding to as many indices as the number indicated by the information corresponding to the number of indices, and information corresponding to the positions where the pieces of information corresponding to the numerical values are displayed form a set.

Also regarding 6, 7, and 8, the lens microcomputer 111 has the above set of pieces of information in the foot representation, which is a unit system different from the meter representation.

Further, also regarding 9, 10, and 11, the lens microcomputer 111 has the above set of pieces of information in the macro magnification representation, which is a unit system different from the meter representation and the foot representation.

As described above, regarding information that varies depending on the unit system, the lens microcomputer 111 has information with respect to each unit system.

"12. normalized placement position information regarding an "∞" mark on the distance bar", i.e., the placement position of the "∞" mark in FIG. 8, is the same on the distance bar in any of the meter representation, the foot representation, and the macro magnification representation. Thus, the parameter may only need to have a single common value.

The above parameters are not dynamically changed. Thus, when the camera main body 200 to which the interchangeable lens 100 is attached starts (or at the timing when the interchangeable lens 100 is attached to the camera main body 200 in the state where the camera is operating), the parameters are acquired. In step S1004, the camera microcomputer 205 inquires of the interchangeable lens 100 about the data size of communication data of the static display information. This is because the number of representative indices changes depending on the specs of the interchangeable lens 100, and this is also to finalize the communication size in advance to communicate all the static display information in the communication mode M3, where the effective communication rate is higher.

In step S1023, the lens microcomputer 111 generates the static display information to be displayed at the display unit 206 of the camera main body 200 and responds to the camera microcomputer 205 with the data size of the static display information.

In steps S1005 and S1024, to collectively acquire the static display information at high speed, the communication mode is switched to the communication mode M3 described in FIGS. 5A, 5B, and 5C, where the effective communication speed is the highest. In the communication mode M3, the data communication directions of the communication terminals are switched. Thus, the directions of internal buffers are switched in order such that collision of data communication does not occur. Thus, a process for switching the communication mode is required. Although it takes a certain processing time to perform the switching process, it is possible to shorten the communication time in a case where the amount of communication is somewhat large. Conversely, if the communication mode M3 is used in a case where the amount of communication is small, the process for switching the communication mode results in overhead, thereby lengthening the communication processing time. Since the data size of the static display information is somewhat large in this case, it is possible to shorten the communication time using the communication mode M3.

In step S1006, the camera microcomputer 205 communicates an acquisition request command to acquire the static display information. In step S1025, the lens microcomputer 111 having received the communication command performs a process for normalizing the static display information, which has been generated in step S1023, to be displayed at the display unit 206 of the camera. The normalization process may only need to be performed, for example, after the camera microcomputer 205 asserts the signal RTS and by the time when the data DLC is transmitted in FIGS. 5A, 5B, and 5C. Alternatively, the normalization process may be performed simultaneously with the data generation process in step S1023.

In step S1026, the lens microcomputer 111 communicates data subjected to the process for normalizing the static display information to the camera microcomputer 205 through the DLC communication channel. In step S1007, the camera microcomputer 205 receives the data.

In steps S1008 and S1027, the communication mode returns to the communication mode M2. This is because in the processes of steps S1006, S1007, S1025, and S1026, the camera microcomputer 205 completes the communication of a large amount of data (e.g., the above items 1 to 13) required to display static lens information that does not dynamically change.

In step S1009, the camera microcomputer 205 transmits the normalized static display information to a block (not illustrated) for controlling the camera display unit 206.

In step S1010, the camera microcomputer 205 determines whether the display of the distance information is set to "enabled" in the setting of the camera menu. If the display setting is disabled (No in step S1010), it is not necessary to display the distance information until the menu is set to "the display setting is enabled" again. Thus, the camera microcomputer 205 shifts to a steady state. If the display setting is enabled in the menu (Yes in step S1010), then in step S1011 and after that, the processing proceeds to a process for communicating and displaying the object distance information that dynamically changes.

A description is given of the dynamic display information that is required to display the object distance information.

The dynamic display information is information required to change the display state based on the state of an operation member of the camera main body 200 or the interchangeable lens 100. In the present exemplary embodiment, the dynamic display information is, for example, the following parameters.

Information Regarding Whether Display is to be Performed 1. whether the object distance information is to be displayed or hidden Information Corresponding to a Position 2. normalized position information regarding the current object distance on the distance bar
3. normalized position information regarding the focus limit on the infinity end side on the distance bar
4. normalized position information regarding the focus limit on the closest end side on the distance bar
5. normalized position information regarding the macro area on the distance bar First, the "information regarding whether display is to be performed" is described. For example, the lens microcomputer 111 notifies the camera microcomputer 205 of the information "1. whether the object distance information is to be displayed or hidden" in a case where the object distance information should be hidden. For example, to avoid showing the user uncomfortable display in a case where the driving of the focus lens 104 of the interchangeable lens 100 enters an irregular state, such as where the driving of the focus lens 104 steps out, the lens microcomputer 111 communicates "hidden" to the camera microcomputer 205. As another exemplary embodiment, the lens microcomputer 111 may communicate not "hidden" but "stop an update from the previous display status" to the camera microcomputer 205. A configuration may be employed in which "the information regarding whether display is to be performed" further includes "whether information regarding the driving state of the focus lens is to be displayed or hidden". This information is communicated, whereby it is possible to display the icons 811 and 812 indicating the driving direction of the focus lens 104. At this time, information regarding the driving direction of the focus lens 104 may also be transmitted from the lens microcomputer 111 to the camera microcomputer 205, where necessary. Alternatively, "whether information regarding the driving state of the focus lens in the infinity direction is to be displayed or hidden" and "whether information regarding the driving state of the focus lens in the closest direction is to be displayed or hidden" may be transmitted as different pieces of information. Further, in a configuration in which an icon is separately displayed in a case where the above regeneration driving is performed, "whether the icon regarding regeneration driving is to be displayed or hidden" may be transmitted from the lens microcomputer 111 to the camera microcomputer 205.

Next, the "information corresponding to a position" is described. "2. normalized position information regarding the current object distance on the distance bar" is a parameter indicating a display position normalized with respect to the entire length of the distance bar in FIG. 8 and corresponds to the arrow 814. The lens microcomputer 111 can acquire absolute position information regarding focus pulses based on output information regarding the focus position detection sensor 140. The lens microcomputer 111 calculates the current focus pulse position as a normalized value from the absolute position information regarding focus pulses and position information regarding a pulse encoder from the closest side to the infinity side.

"3. normalized position information regarding the focus limit on the infinity end side on the distance bar" is a parameter indicating a display position normalized with respect to the entire length of the distance bar in FIG. 8 and corresponds to the arrow 815.

In step S1011, the camera microcomputer 205 communicates to the lens microcomputer 111 an acquisition request command to acquire the display information that dynamically changes.

In step S1028, the lens microcomputer 111 generates the display information that dynamically changes. Then, the lens microcomputer 111 performs a process for normalizing the display information. In step S1029, the lens microcomputer 111 responds to the camera microcomputer 205 with the normalized display information as a communication result. In step S1012, the camera microcomputer 205 receives this response result.

In step S1013, the camera microcomputer 205 transmits the display information that dynamically changes and is acquired in step S1012, as information for initially displaying the object distance information to the camera display unit 206.

A description is given of the significance of communicating the static display information in the communication mode M3 and communicating the dynamic display information in the communication mode M2.

The above processing achieves the communication and display process when the camera starts, and then achieves the initial display state as in the example illustrated in FIG. 8.

<Steady Operation Process>

Figure 11A:
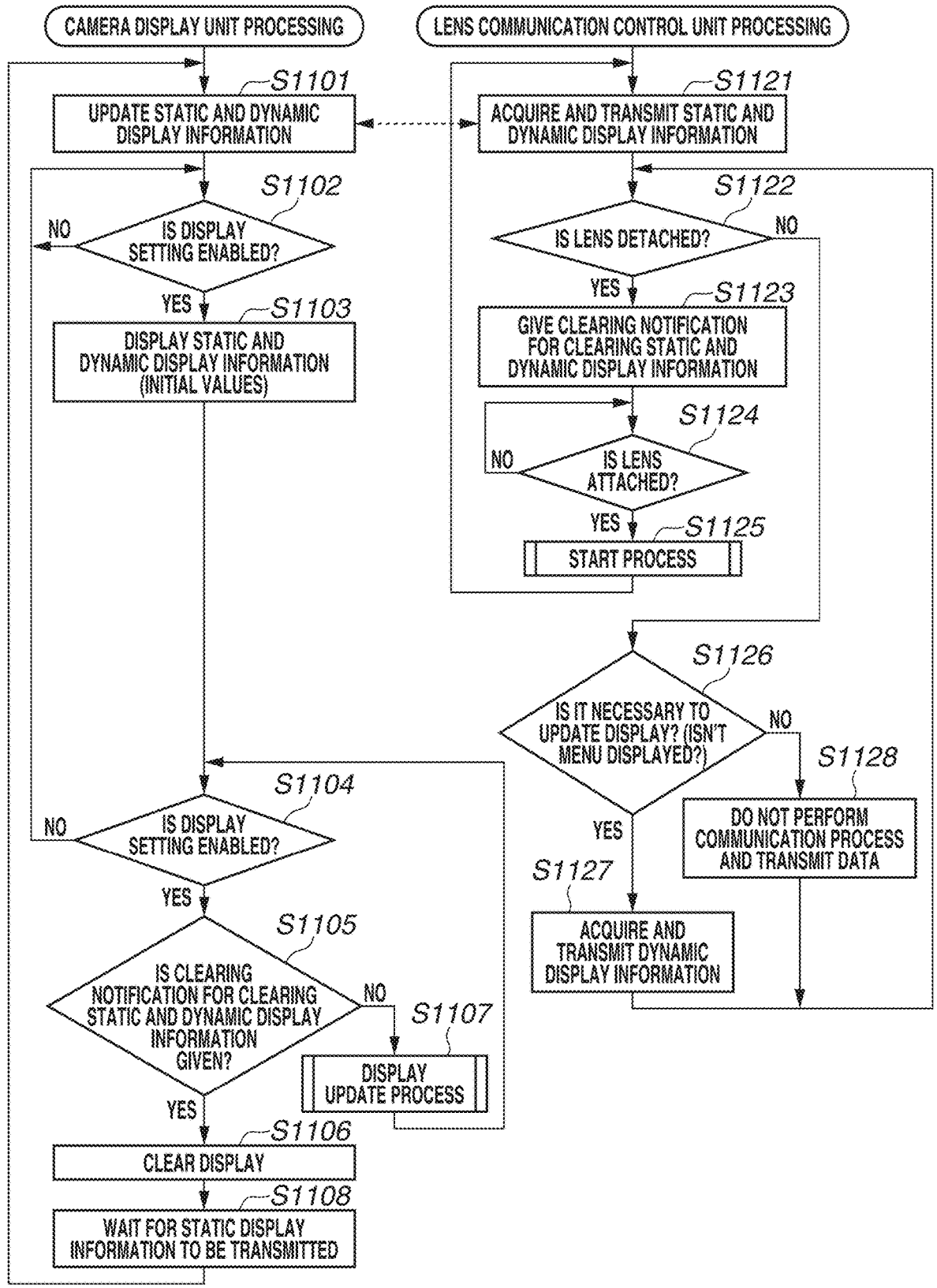
FIG. 11A is a flowchart illustrating steady operations of the imaging apparatus and the accessory device.
Figure 11B:
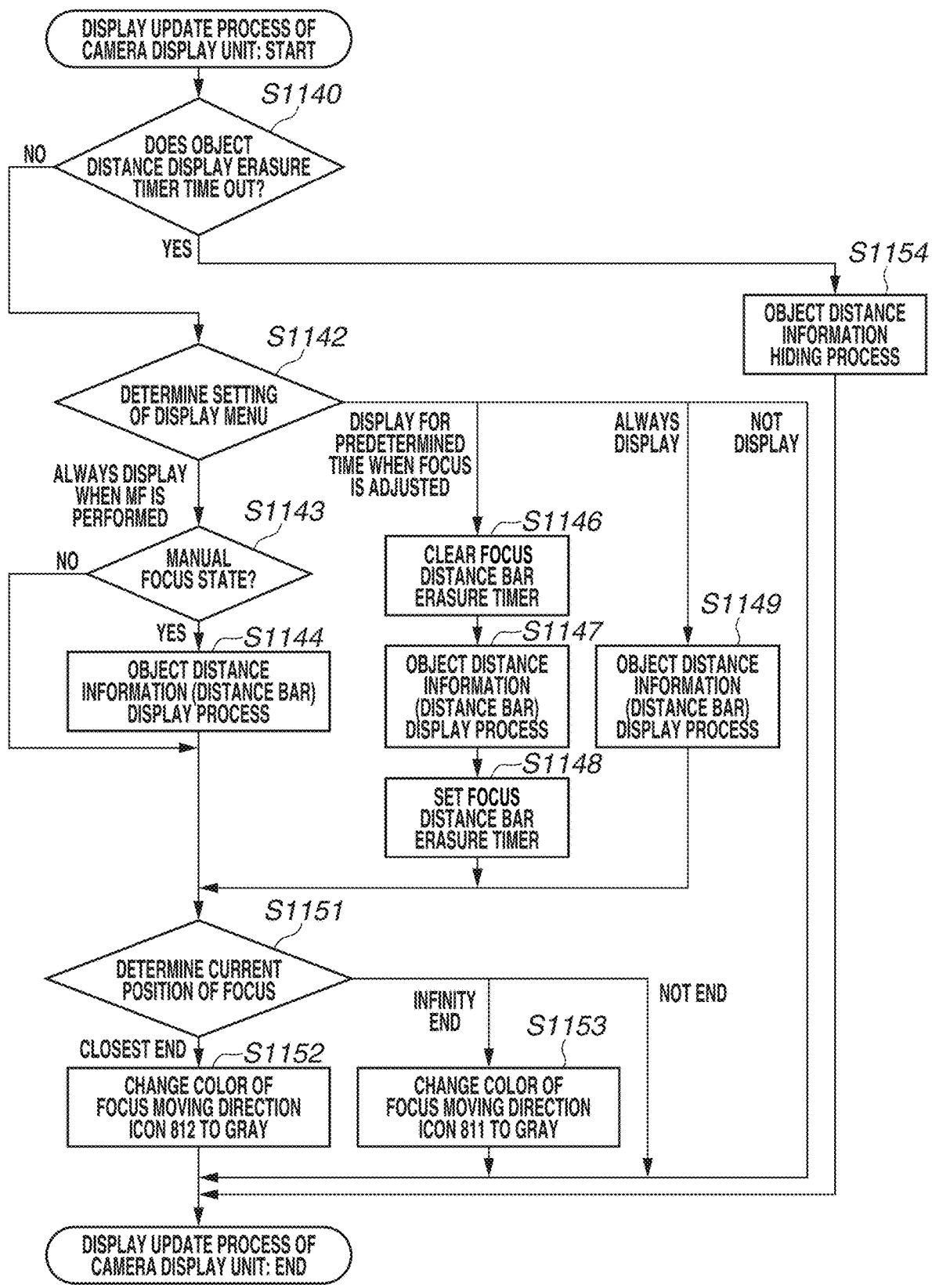
FIG. 11B is a flowchart illustrating a process for updating display of a camera display unit.

Next, with reference to flowcharts in FIGS. 11A and 11B, a description is given of a process for updating the display of the object distance information when the camera is in the steady state.

FIG. 11A is a flowchart illustrating the processing of the camera main body 200 and the processing of the interchangeable lens 100 regarding the display of the object distance information. The processing is executed by a program recorded in the camera microcomputer 205. The process for displaying the information is described regarding both the processes of the lens communication control unit 110 that communicates with the interchangeable lens 100, and the processing of the camera display unit 206 that performs the display process.

First, the processing of the camera display unit 206 is described.

Figure 10:
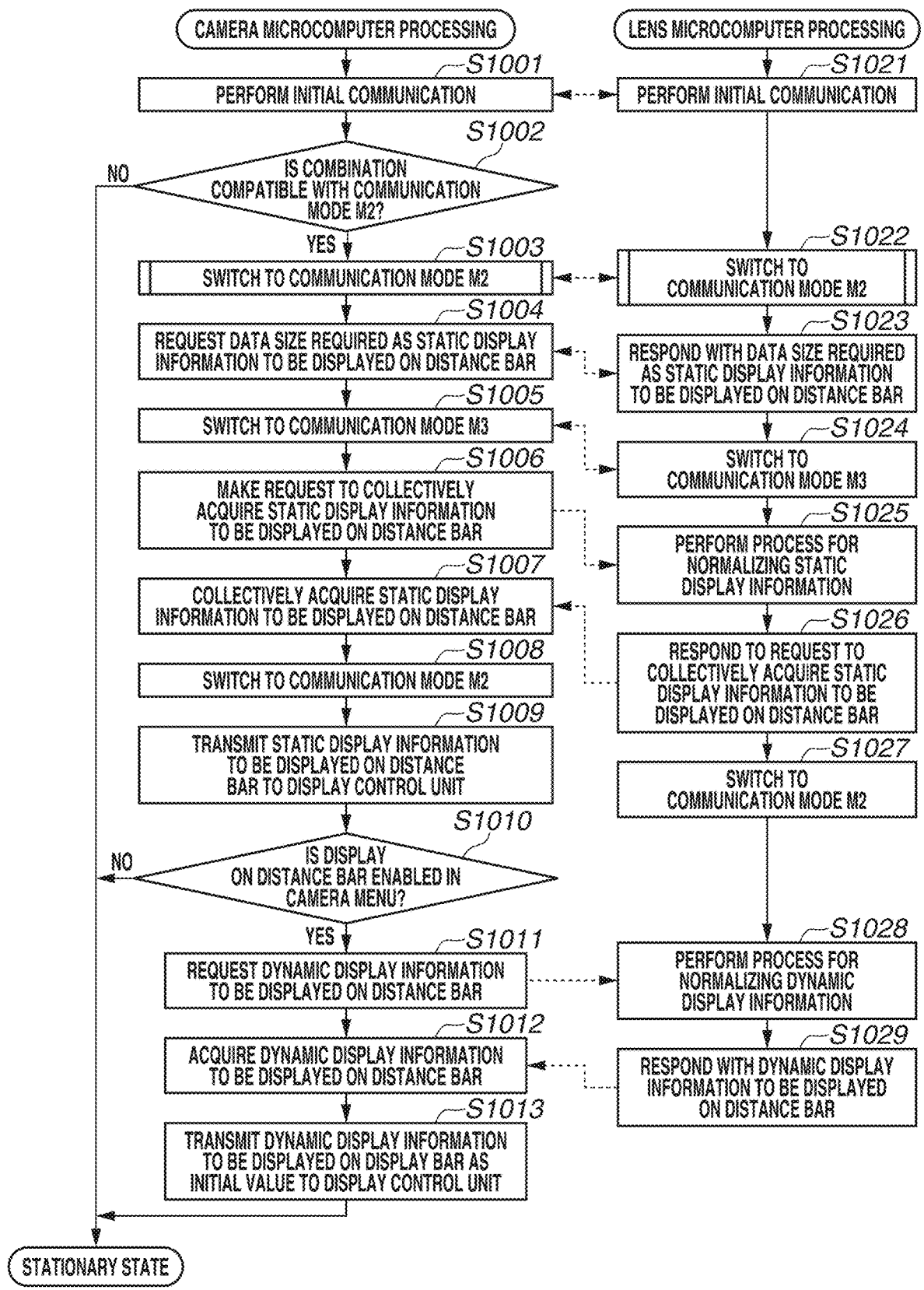
FIG. 10 is a flowchart illustrating a process regarding start operations of the imaging apparatus and the accessory device.

In steps S1101 and S1121, as described in the start process in FIG. 10, the static display information and the dynamic display information as initial values for display from the interchangeable lens 100 are transmitted from the lens communication control unit 110 to the camera display unit 206.

In step S1102, the camera display unit 206 determines which of "a setting for displaying" the object distance information and "a setting for not displaying" the object distance information is made as the state of the menu of the camera. If "a setting for not displaying" the object distance information is made (No in step S1102), this display process is not performed. Thus, the camera display unit 206 waits for the setting of the menu to be changed. If "a setting for displaying" the object distance information is made (Yes in step S1102), the processing proceeds to step S1103.

In step S1103, the camera display unit 206 displays the static display information and the dynamic display information as initial values acquired from the lens communication control unit 110 in step S1101. The positions of the representative index values 806 and the current object distance position 809 of these pieces of display information are relative positions in a case where the entire length of the focus distance bar is 100. More specifically, in a case where the display position of the representative index value "0.8" of the focus distance is "20", the representative index value "0.8" is displayed at a position of 100 pixels relative to the entire length of the focus distance bar, i.e., 500 pixels.

In step S1104, to determine whether the display of the dynamic display information is to be updated as the subsequent processing, the camera display unit 206 reconfirms the display setting. After a display update process in step S1107 is performed, then in this step, it is determined whether the display update process is to be continued.

In step S1105, the camera display unit 206 determines whether a notification for clearing the static and dynamic display information is given by the lens communication control unit 110. If a clearing notification for clearing the display is given (Yes in step S1105), then in step S1106, the camera display unit 206 clears the display state of the display unit 206. In step S1108, the camera display unit 206 waits for the static display information to be transmitted from the lens communication control unit 110 again. A notification for clearing the display is not given (No in step S1105), the proceeding proceeds to the display update process in step S1107. This process will be described below with reference to a subroutine in FIG. 11B.

Next, the processing of the communication control unit 110 of the interchangeable lens 100 will be described.

In step S1121, the communication control unit 110 transmits the static display information and the dynamic display information as initial values to the camera display unit 206.

In step S1122, the communication control unit 110 determines whether the interchangeable lens 100 is detached. If the interchangeable lens 100 is detached (Yes in step S1122), the communication control unit 110 transmits a notification for clearing the static and dynamic display information to the camera display unit 206. This is because when the lens is detached, it is necessary to hide the display of the camera display unit 206, and then, if another interchangeable lens 100 is attached, it is necessary to perform display based on the specs of the attached interchangeable lens 100.

In step S1124, the communication control unit 110 waits until the camera microcomputer 205 confirms the state where the lens is attached in the communication I/F circuit 208.

In step S1125, the initial communication process between the camera microcomputer 205 and the lens microcomputer 111 described in FIG. 10 is performed. By this process, the static display information and the dynamic display information as initial values corresponding to the specs of the interchangeable lens 100 are acquired, and the process for display from step S1121 is performed again.

If the lens 100 continues to be attached in step S1122 (No in step S1122), the processing proceeds to step S1126. In step S1126, the communication control unit 110 determines whether it is necessary to update the object distance information regarding the interchangeable lens 100. For example, while the menu is being displayed, and if the distance bar for displaying the object distance is not displayed, the determination is "No" (No in step S1126), and the processing proceeds to step S1128. If it is determined that it is necessary to update the display (Yes in step S1126), the processing proceeds to step S1127. In step S1127, the communication control unit 110 performs a process for acquiring the dynamic display information from the interchangeable lens 100 and transmits the dynamic display information to the camera display unit 206. If, however, it is not necessary to update the display (No in step S1126), the processing proceeds to step S1128. In step S1128, the communication control unit 110 does not perform a communication process with the interchangeable lens 100.

With reference to a timing chart of a communication process in FIG. 12, the communication process in steps S1127 and S1128 is described.

FIG. 12 is a timing chart of a lens communication control process performed between the camera microcomputer 205 and the lens microcomputer 111, where the horizontal axis represents the lapse of time, and the vertical axis represents communication items. In this case, communication control during live view is illustrated as an example. Alternatively, viewfinder imaging may also be used.

An imaging synchronization signal 1201 indicates the start timing of accumulation control 1202 of the image sensor 201. The imaging synchronization signal 1201 is generated in a cycle corresponding to the frame rate. For example, if control is performed at 60 fps, a vertical synchronization signal 1210 is input to the camera microcomputer 205 in a cycle of 16.6 ms. A timing 1211 indicates the center-of-gravity timing of the accumulation control 1202 of the image sensor 201.

An item 1203 indicates synchronization signal communication for sharing the exposure timing between the camera main body 200 and the interchangeable lens 100. The communication is performed using the vertical synchronization signal 1210 as a trigger. In each communication process illustrated in FIG. 12, a process indicated by a shaded portion indicates a communication process in which there is a timing restriction. If delay occurs in a synchronization signal communication process 1220, there is a difference in the recognition of the exposure timing between the camera microcomputer 205 and the lens microcomputer 111. Thus, it is necessary to execute communication based on a predetermined timing restriction. Communication for displaying the object distance information achieved by the present exemplary embodiment needs to be performed so as not to influence such a communication process in which there is a timing restriction.

An item 1204 is a communication process for an image stabilization function in which the camera microcomputer 205 and the lens microcomputer 111 operate in conjunction with each other. For example, an example is illustrated where two communication processes 1221 and 1222 are performed with regard to one frame. There is a timing restriction in which the communication 1222 is performed before or at a predetermined timing with the center-of-gravity timing 1211 of the accumulation control 1202 of the image sensor 201 as the starting point.

An item 1205 is a communication process for autofocus control. For example, a process 1223 is communication for acquiring from the interchangeable lens 100 a parameter for correcting a defocus amount or the current state information regarding the focus lens 104. For example, a process 1224 is communication in which the camera microcomputer 205 requests the lens microcomputer 111 to drive the focus ring for focusing.

An item 1206 is a communication process for automatic exposure (AE) control. For example, a process 1225 is communication for acquiring from the interchangeable lens 100 the current optical information such as the aperture diameter value used for exposure control. A process 1226 is communication in which the camera microcomputer 205 requests the lens microcomputer 111 to drive the diaphragm.

An item 1207 is a data communication process for displaying the object distance and is communication for acquiring from the interchangeable lens 100 the display information that dynamically changes. Ideally, as illustrated in FIG. 12, all the communication processes should be performed in one frame. However, in a case where there is no room in the communication band, for example, data communication for AE is scheduled to be performed every two frames. In the present exemplary embodiment, an example has been described where the dynamic display information is periodically communicated. The present disclosure, however, is not limited to this so long as, if the dynamic display information changes, display according to the change can be performed. For example, the lens microcomputer 111 may detect that the dynamic display information changes. Then, according to the detection, the lens microcomputer 111 may notify the camera microcomputer 205 that a change in the dynamic display information is detected, thereby communicating the dynamic display information only if necessary.

Next, with reference to FIG. 11B, a description is given of a display update process of the camera display unit 206 in step S1107.

In step S1140, the camera display unit 206 determines a timeout status in a case where the display state of the object distance is set to hidden based on a timer. This mode will be described below in step S1146. If, as a result of the determination of whether the display is to be maintained based on a timeout, the display is to be maintained (No in step S1140), the processing proceeds to step S1142. If it is determined that the display is to be hidden (Yes in step S1140), the processing proceeds to step S1154.

In step S1142, the camera display unit 206 determines the setting status of a display menu regarding how to display information. In the present exemplary embodiment, in the menu, the display pattern of the object distance information can be set among "always display when MF is performed", "display for predetermined time when focus is adjusted", "always display", and "not display". If the display setting of the menu is "always display when MF is performed", the processing proceeds to step S1143. If the display setting of the menu is "display for predetermined time when focus is adjusted", the processing proceeds to step S1146. If the display setting of the menu is "always display", the processing proceeds to step S1149. If the display setting of the menu is "not display", this subroutine ends.

In step S1143, the camera microcomputer 205 determines which of an AF state and an MF state the interchangeable lens 100 notifies the camera microcomputer 205 of as the state of a lens focus switch provided in the lens barrel. As another exemplary embodiment, in a form in which the AF state and the MF state are switched in the camera menu, the camera microcomputer 205 may confirm the setting state of the menu. If the state is the AF state (No in step S1143), the processing proceeds to step S1151. If the state is the MF state (Yes in step S1143), the processing proceeds to step S1144.

In step S1144, based on the latest dynamic display information, the camera microcomputer 205 performs a display update process for updating the display of the object distance information (distance bar information) at the display unit 206.

In step S1146, the camera microcomputer 205 clears the timer for erasing the display of the object distance using a bar.

The process of step S1147 is similar to that of step S1144.

In step S1148, to hide the distance bar for the object distance information in a predetermined time, the camera microcomputer 205 sets the timer for erasing the object distance information.

If the setting of the menu is assigned to "always display" in step S1142, the processing proceeds to step S1149. The processing content of step S1149 is similar to that of step S1144.

If the display setting of the menu is a setting other than "not display", then in step S1151, the camera microcomputer 205 makes a determination to notify the user that the focus is at the closest end or the infinity end.

More specifically, the camera microcomputer 205 determines the "normalized position information regarding the current object distance on the distance bar" included in the dynamic display information. If the position information indicates the closest end position, the processing proceeds to step S1152. If the position information indicates the infinity end position, the processing proceeds to step S1153. If the position information indicates neither the closest end nor the infinity end, this subroutine ends.

In step S1152, the camera microcomputer 205 changes the color of the focus moving direction icon 812 to gray. This causes the user to recognize that the focus will not change even if the focus ring is rotated further to the closest side when the manual focus operation is performed.

In step S1153, the camera microcomputer 205 changes the color of the focus moving direction icon 811 to gray. This causes the user to recognize that the focus will not change even if the focus ring is rotated further to the "∞" side when the manual focus operation is performed.

If it is determined in step S1140 that the display state of the object distance is set to hidden based on the timer (Yes in step S1140), the processing proceeds to step S1154. In step S1154, the camera microcomputer 205 hides the various pieces of object distance information described in FIG. 8.

By the above communication method between the imaging apparatus and the accessory device and the above display process by the imaging apparatus, the position where information regarding the object distance information to be displayed in the imaging apparatus is displayed is transmitted as a normalized numerical value to the imaging apparatus through communication. Consequently, no matter what imaging apparatus the accessory devices different in specs are attached to, it is possible to perform optimal display.

Further, data regarding scale display for displaying the object distance information is acquired when the accessory device is attached. Then, in a steady state, only the object distance information regarding the accessory device that dynamically changes is acquired, thereby minimizing the communication load. This reduces the influence on various types of control such as AF control, AE control, and image stabilization control and also enables communication for displaying an object to be performed frequently, such as every vertical signal timing. Thus, it is possible to perform various types of driving control and achieve the display of the object distance information without delay in the display.

In the first exemplary embodiment, a description has been given of a case where the object distance information detected by the lens microcomputer 111 is displayed at the display unit 206 of the camera main body 200, and a case where the macro magnification information or the depth-of-field information is further displayed. In a second exemplary embodiment, a case is described where the camera microcomputer 205 acquires through communication the camera shake state information obtained by the shake sensor of the vibrating gyroscope and detected by the lens microcomputer 111 and displays the camera shake state information at the display unit 206.

Various components of the camera main body 200 and the interchangeable lens 100, a start process, and a communication process in a steady state are similar to those in the first exemplary embodiment, and therefore are not described here.

In the display of the camera shake information achieved in the present exemplary embodiment, the present exemplary embodiment is different from the first exemplary embodiment in items communicated as the dynamic display information and the static display information and control regarding display. Thus, these differences are described.

In the present exemplary embodiment, in addition to the static display information described in the first exemplary embodiment, as static display information for displaying a camera shake status, the lens microcomputer 111 transmits the following information to the camera microcomputer 205.

1. the presence or absence of a vibrating gyroscope in the interchangeable lens 100

That is, the camera microcomputer 205 transmits information indicating that the camera microcomputer 205 has the function of detecting the camera shake status, as information corresponding to the presence or absence of a function, to the lens microcomputer 111.

Then, in the present exemplary embodiment, information to be acquired as the dynamic display information is switched depending on the display target. If the display target is the "camera shake status", the lens microcomputer 111 transmits the following information as the dynamic display information to the camera microcomputer 205.

1. the vibration detection value in the pitch direction of the vibrating gyroscope 2. the vibration detection value in the yaw direction of the vibrating gyroscope That is, the lens microcomputer 111 transmits detection values obtained by detecting the camera shake status to the camera microcomputer 205. If, on the other hand, the display target is not the "camera shake status", the lens microcomputer 111 transmits the static display information described in the first exemplary embodiment to the camera microcomputer 205.

Figure 13:
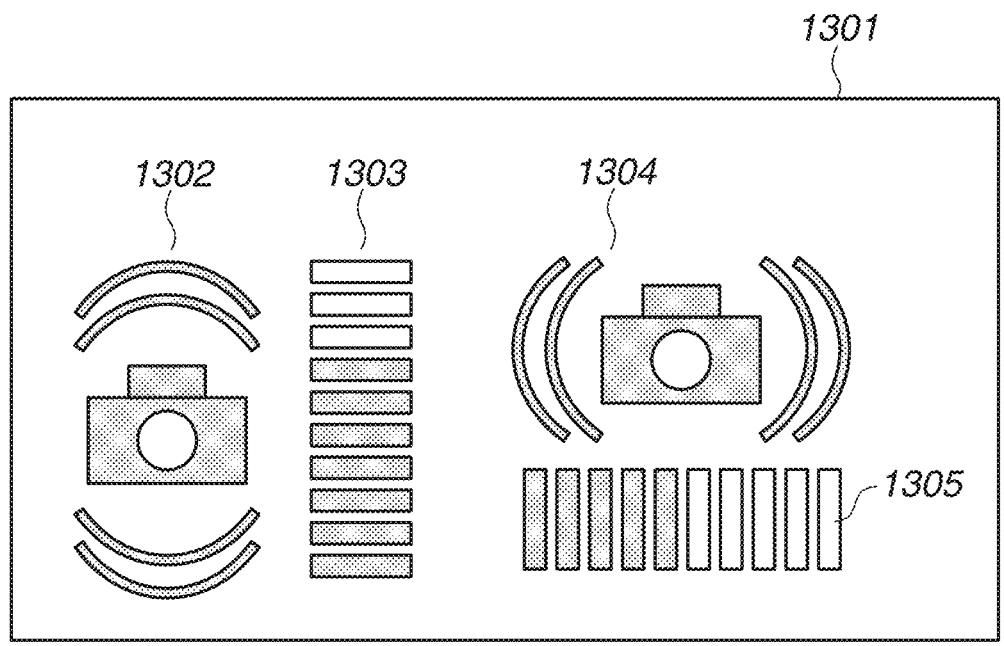
FIG. 13 is a diagram illustrating an example of display of a camera shake status according to a second exemplary embodiment.

First, with reference to FIG. 13, the display content of the camera shake status is described.

A state 1301 illustrates an example where the detection status of the current camera shake amount is displayed. In the information display, the camera microcomputer 205 acquires through communication the camera shake state information obtained by the shake sensor of the vibrating gyroscope of the interchangeable lens 100 and displays the camera shake state information at the display unit 206. A state 1302 indicates the vibration status in the pitch direction, and a gauge 1303 indicates the vibration level. Similarly, a state 1304 indicates the vibration status in the yaw direction, and a gauge 1305 indicates the vibration level.

Next, a control flow for display will be described.

Figure 14:
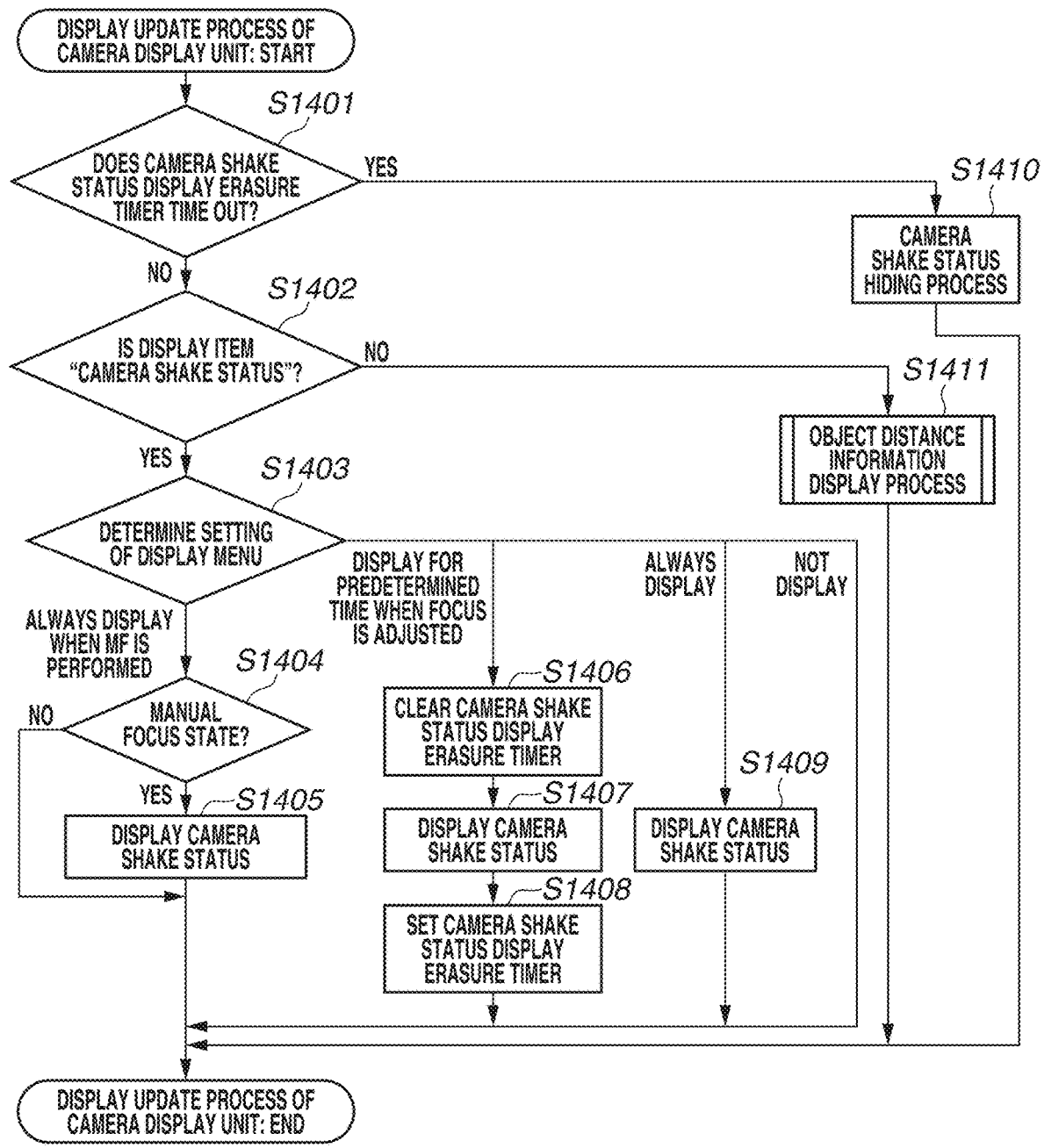
FIG. 14 is a flowchart illustrating a process for displaying the camera shake status according to the second exemplary embodiment.

The present exemplary embodiment is similar to the first exemplary embodiment in the flow of the start process described with reference to FIG. 10 and the flow of the steady operation process described with reference to FIG. 11A, except for step S1127 in the communication process of the interchangeable lens 100 and step S1107 in the processing of the camera display unit 206. Thus, the similar portions are not described here. With reference to FIG. 14, a description is given of a subroutine process of the display update process of the camera display unit 206 in step S1107.

If the subroutine in step S1107 is started, then in step S1401, the camera display unit 206 determines a timeout status in a case where the display state of the camera shake status is set to hidden based on a timer. This mode will be described below in step S1406.

In step S1402, the camera display unit 206 determines whether a target to be displayed at the display unit 206 is the "camera shake status" in the setting of the menu of the camera. If a display menu is set to the "camera shake status" (Yes in step S1402), then in step S1403, the camera display unit 206 further determines the setting status of a display menu regarding how to display information. Similar to the first exemplary embodiment, the display pattern of the camera shake status can be set among "always display when MF is performed", "display for predetermined time when focus is adjusted", "always display", and "not display".

If the display setting of the menu is "always display when MF is performed", the processing proceeds to step S1404. If the display setting of the menu is "display for predetermined time when focus is adjusted", the processing proceeds to step S1406. If the display setting of the menu is "always display", the processing proceeds to step S1409. If the display setting of the menu is "not display", the subroutine ends.

In step S1404, the camera microcomputer 205 determines which of the AF state and the MF state the interchangeable lens 100 notifies the camera microcomputer 205 of as the state of the lens focus switch provided in the lens barrel. As another exemplary embodiment, in a form in which the AF state and the MF state are switched in the camera menu, the camera microcomputer 205 may confirm the setting state of the menu. If the state is the AF state (No in step S1404), the subroutine ends. If the state is the MF state (Yes in step S1404), then in step S1405, the camera microcomputer 205 displays the camera shake status.

In step S1406, the camera microcomputer 205 clears the timer for erasing the camera shake status.

The process of step S1407 is similar to that of step S1405.

In step S1408, to hide the camera shake status in a predetermined time, the camera microcomputer 205 sets the timer for erasing the camera shake status.

If the setting of the menu is assigned to "always display" in step S1403, the processing proceeds to step S1409. The processing content of S1409 is similar to that of step S1405.

If the camera shake status display timer times out in step S1401 (Yes in step S1401), then in step S1410, the camera microcomputer 205 hides the camera shake status.

If the display item is not the "camera shake status" in step S1402 (No in step S1402), then in step S1411, the camera microcomputer 205 proceeds to the process for displaying the object distance information described in the first exemplary embodiment.

Figure 15:
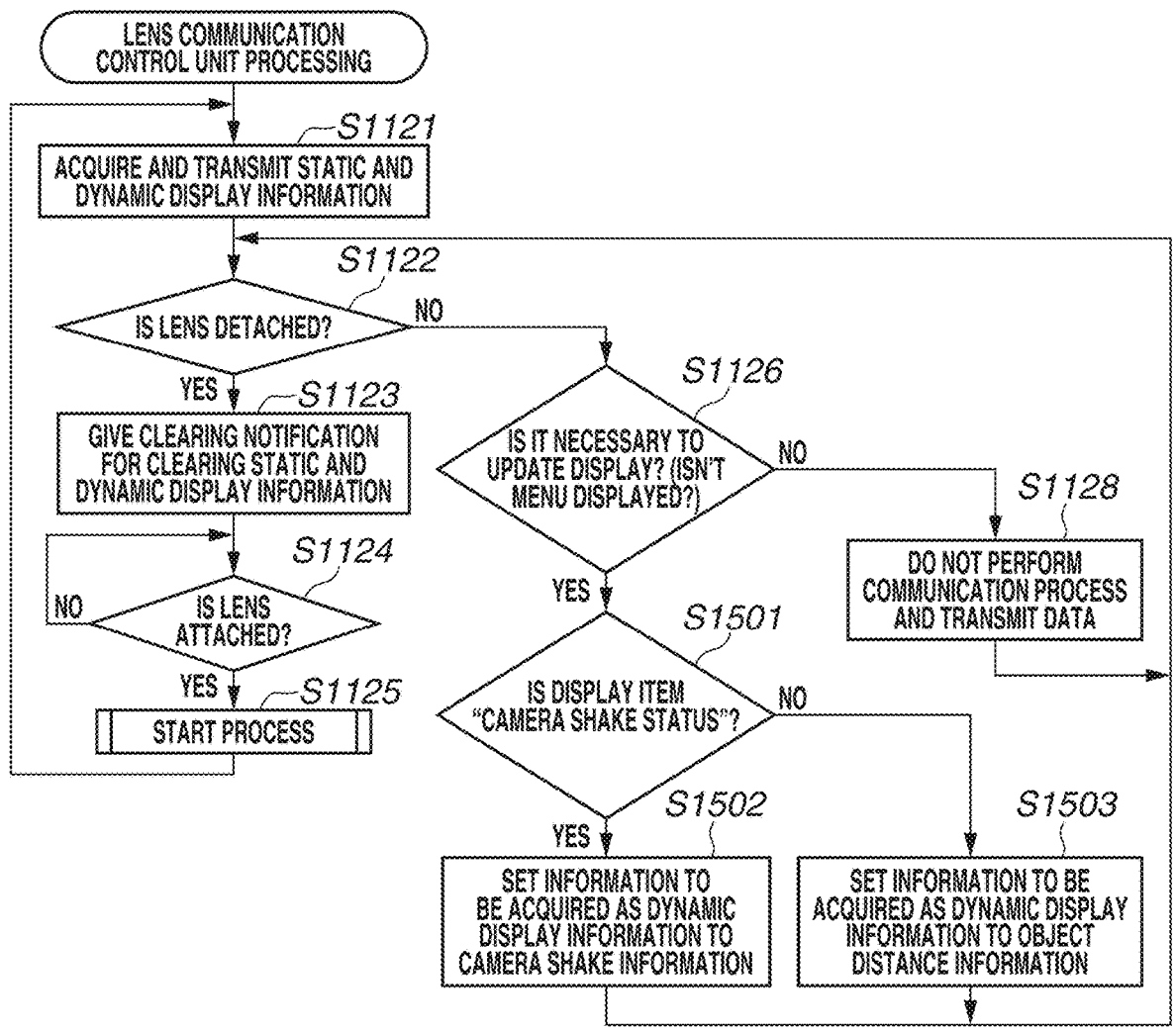
FIG. 15 is a flowchart illustrating a lens communication control unit process for displaying the camera shake status according to the second exemplary embodiment.

Next, with reference to FIG. 15, a lens communication control unit process according to the present exemplary embodiment will be described. As described above, however, processes are similar to those in the first exemplary embodiment except for step S1127.

If it is determined in step S1126 that it is necessary to update the display in the camera state (Yes in step S1126), the processing proceeds to step S1501.

In step S1501, the lens communication control unit 110 determines whether a target to be displayed is the "camera shake status" in the menu of the camera. If the display target is the "camera shake status" (Yes in step S1501), then in step S1502, the lens communication control unit 110 sets the dynamic display information to be acquired from the lens microcomputer 111 to the following values required to display the "camera shake status".

1. the vibration detection value in the pitch direction of the vibrating gyroscope
2. the vibration detection value in the yaw direction of the vibrating gyroscope If the display target is not the "camera shake status" but the "object distance information" (No in step S1501), then in step S1503, the lens communication control unit 110 sets information to be acquired from the lens microcomputer 111 to the following information required to display the object distance information described in the first exemplary embodiment.

1. whether the object distance information is to be displayed or hidden
2. normalized position information regarding the current object distance on the distance bar
3. normalized position information regarding the focus limit on the infinity end side on the distance bar
4. normalized position information regarding the focus limit on the closest end side on the distance bar
5. normalized position information regarding the macro area on the distance bar More specifically, a communication command to acquire the "camera shake status" and a communication command to acquire the "object distance information" are defined and appropriately used based on the camera menu.

As described above, in the present exemplary embodiment, data regarding scale display for displaying the object distance information that varies depending on the specs of the accessory device and information required to display the camera shake status are acquired when the accessory device is attached. Further, then, in a steady state, the object distance information regarding the accessory device that dynamically changes and the information regarding the camera shake status are exclusively acquired. Consequently, in a steady operation, only parameters that dynamically change and are required for display are communicated. This reduces the amount of use of the communication band and minimizes the system load, whereby it is possible to prevent delay in the acquisition of display information from the accessory device.

In the first exemplary embodiment, a description has been given of a case where the object distance information detected by the lens microcomputer 111 is displayed at the display unit 206 of the camera main body 200, and a case where the macro magnification information or the depth-of-field information is further displayed. In a third exemplary embodiment, a case is described where, if the interchangeable lens 100 is a zoom lens, the camera microcomputer 205 acquires information regarding the zoom position through communication and displays the information at the display unit 206.

Various components of the camera main body 200 and the interchangeable lens 100, a start process, and a communication process in a steady state are similar to those in the first exemplary embodiment, and therefore are not described here. To display the zoom position, however, some items are be additionally acquired as static display information.

That is, in addition to the above items described in the first exemplary embodiment, the lens microcomputer 111 also transmits the following items to the camera microcomputer 205.

13. the number of representative index positions when the zoom position is displayed on a bar
14. the numerical values of representative indices when the zoom position is displayed on a bar (as many as the number of representative index positions)
15. normalized placement position information regarding representative indices on a zoom bar when the zoom position is displayed on the bar (as many as the number of representative positions)

As described above, the static display information according to the present exemplary embodiment includes "the information regarding the display of indices" also for the zoom position. That is, the static display information according to the present exemplary embodiment includes a set of information corresponding to the number of indices, pieces of information corresponding to numerical values to be displayed corresponding to as many indices as the number indicated by the information corresponding to the number of indices, and information corresponding to the positions where the pieces of information corresponding to the numerical values are displayed.

Then, in the present exemplary embodiment, information to be acquired as the dynamic display information is switched depending on the display target. If the display target is the "zoom position", the lens microcomputer 111 transmits the following information as the dynamic display information to the camera microcomputer 205.

Normalized Placement Position Information on the Zoom Bar when the Current Zoom Position is Displayed on the Bar That is, the lens microcomputer 111 transmits information corresponding to the current position of the zoom lens as the "information corresponding to a position" to the camera microcomputer 205. If, on the other hand, the display target is not the "zoom position", the lens microcomputer 111 transmits the static display information described in the first exemplary embodiment to the camera microcomputer 205.

Figure 16:
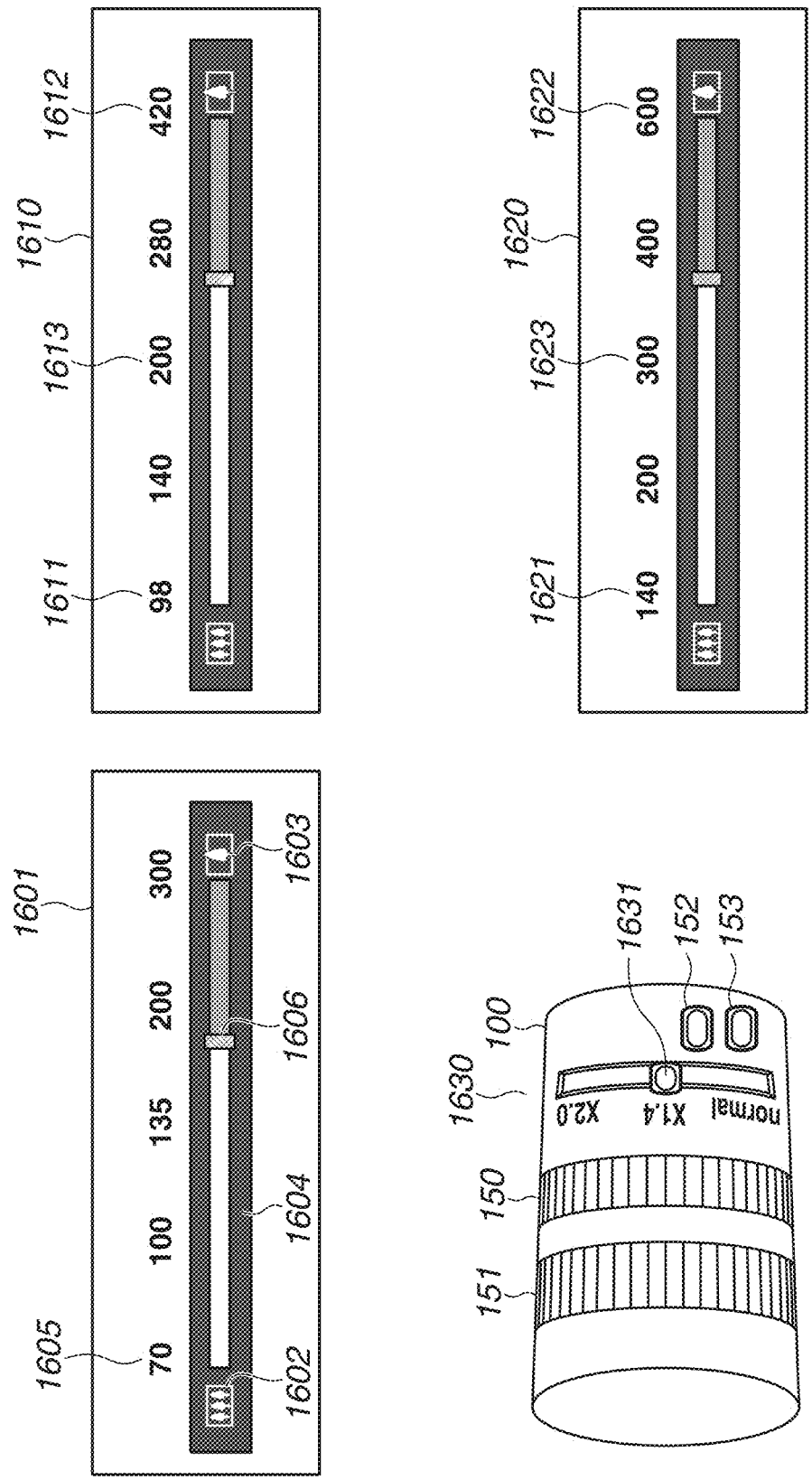
FIG. 16 is diagrams illustrating examples of display of zoom position information and various operation members of an interchangeable lens according to a third exemplary embodiment.

First, with reference to FIG. 16, a description is given of the display content when the zoom position is displayed on a bar.

A state 1601 illustrates an example where the current zoom position is displayed. An icon 1602 indicates the zoom direction on the wide side, and an icon 1603 indicates the zoom direction on the telephoto side. A bar 1604 displays the entire area from the telephoto end to the wide end on a bar. An icon 1605 indicates focal length information as a representative index value of the zoom position similarly to the display of the object distance information. This example of display illustrates the case of a lens having specs in which the focal length can be zoomed from 70 mm to 300 mm. Similarly to the display of the object distance information in the first exemplary embodiment, position information normalized with respect to the entire length of the zoom bar from the interchangeable lens 100 is acquired, thereby determining which numerical values are displayed as these representative index values and which positions the representative index values are displayed at. For example, "70 mm" is displayed at a position of "3" relative to the entire length of the zoom bar, and "135 mm" is displayed at a position of "50" relative to the entire length of the zoom bar. An icon 1606 indicates the current zoom position. The camera microcomputer 205 acquires the icon 1606 as normalized zoom position information from the lens microcomputer 111 and displays the icon 1606 at the display unit 206.

<Control Flow for Display>

Next, a control flow for display will be described.

Figure 17:
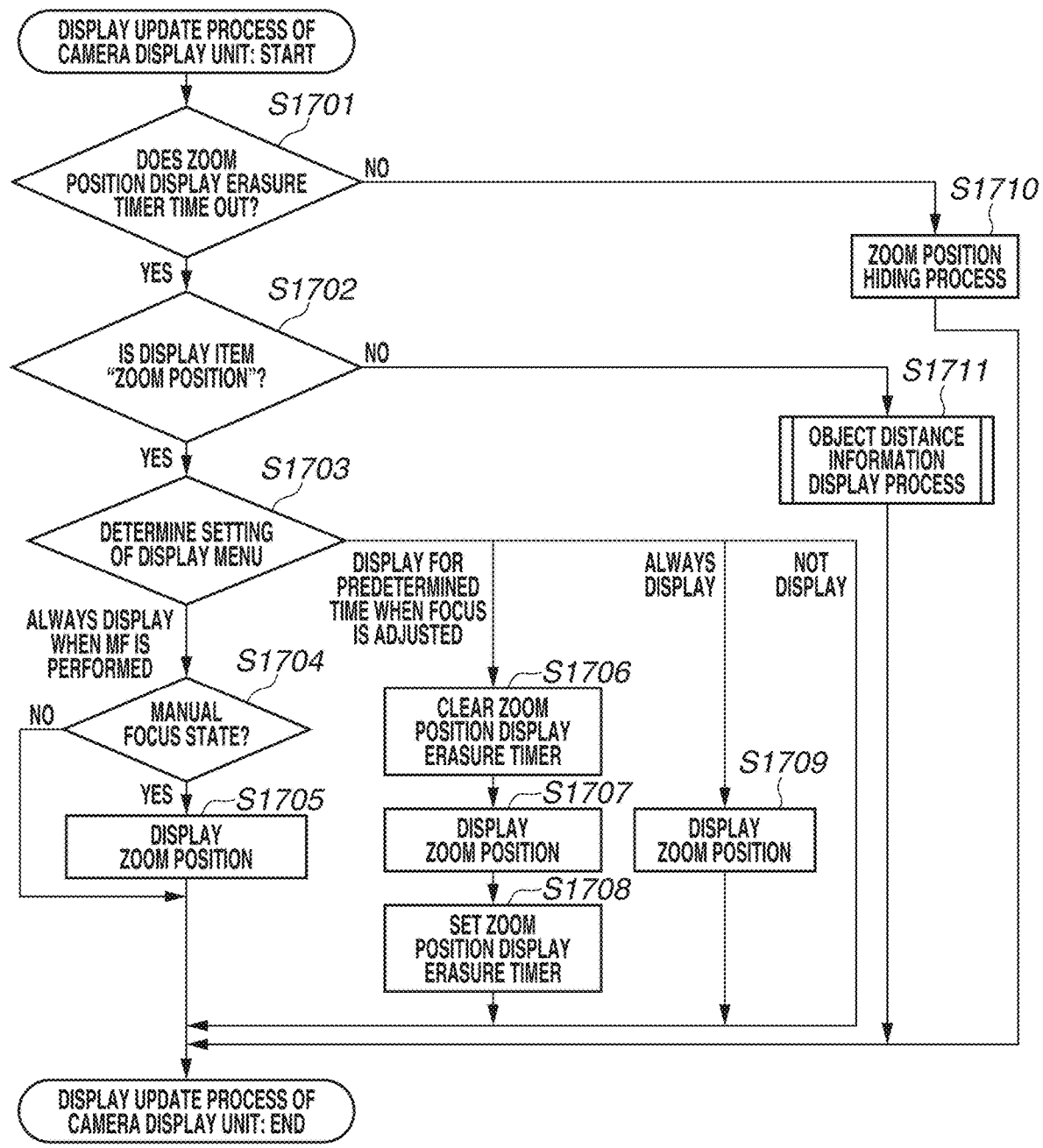
FIG. 17 is a flowchart illustrating a process for displaying the zoom position information according to the third exemplary embodiment.

The present exemplary embodiment is similar to the first exemplary embodiment in the flow of the start process described with reference to FIG. 10 and the flow of the steady operation process described with reference to FIG. 11A, except for step S1127 in the communication process of the interchangeable lens 100 and step S1107 in the processing of the camera display unit 206. Thus, the similar portions are not described here. With reference to FIG. 17, a description is given of a subroutine process of the display update process of the camera display unit in step S1107.

If the subroutine in step S1107 is started, then in step S1701, the camera display unit 206 determines a timeout status in a case where the display state of the zoom position is set to hidden based on a timer. This mode will be described below in step S1706.

In step S1702, the camera display unit 206 determines whether a target to be displayed at the display unit 206 is the "zoom position" in the setting of the menu of the camera. If a display menu is set to the "zoom position" (Yes in step S1702), then in step S1703, the camera display unit 206 further determines the setting status of a display menu regarding how to display information. Similar to the first exemplary embodiment, the display pattern of the zoom position can be set among "always display when MF is performed", "display for predetermined time when focus is adjusted", "always display", and "not display".

If the display setting of the menu is "always display when MF is performed", the processing proceeds to step S1704. If the display setting of the menu is "display for predetermined time when focus is adjusted", the processing proceeds to step S1706. If the display setting of the menu is "always display", the processing proceeds to step S1709. If the display setting of the menu is "not display", this subroutine ends.

In step S1704, the camera microcomputer 205 determines which of the AF state and the MF state the interchangeable lens 100 notifies the camera microcomputer 205 of as the state of the lens focus switch provided in the lens barrel. As another exemplary embodiment, in a form in which the AF state and the MF state are switched in the camera menu, the camera microcomputer 205 may confirm the setting state of the menu. If the state is the AF state (No in step S1704), this subroutine ends. If the state is the MF state (Yes in step S1704), then in step S1705, the camera microcomputer 205 displays the zoom position information.

In step S1706, the camera microcomputer 205 clears the timer for erasing the zoom position information.

The process of step S1707 is similar to that of step S1705.

In step S1708, to hide the zoom position information in a predetermined time, the camera microcomputer 205 sets the timer for erasing the zoom position information.

If the setting of the menu is assigned to "always display" in step S1703, the processing proceeds to step S1709. The processing content of S1709 is similar to that of step S1705.

If the zoom position information display timer times out in step S1701 (Yes in step S1701), then in step S1710, the camera microcomputer 205 hides the zoom position information.

If the display item is not the "zoom position" in step S1702 (No in step S1702), then in step S1711, the camera microcomputer 205 proceeds to the process for displaying the object distance information described in the first exemplary embodiment.

Figure 18:
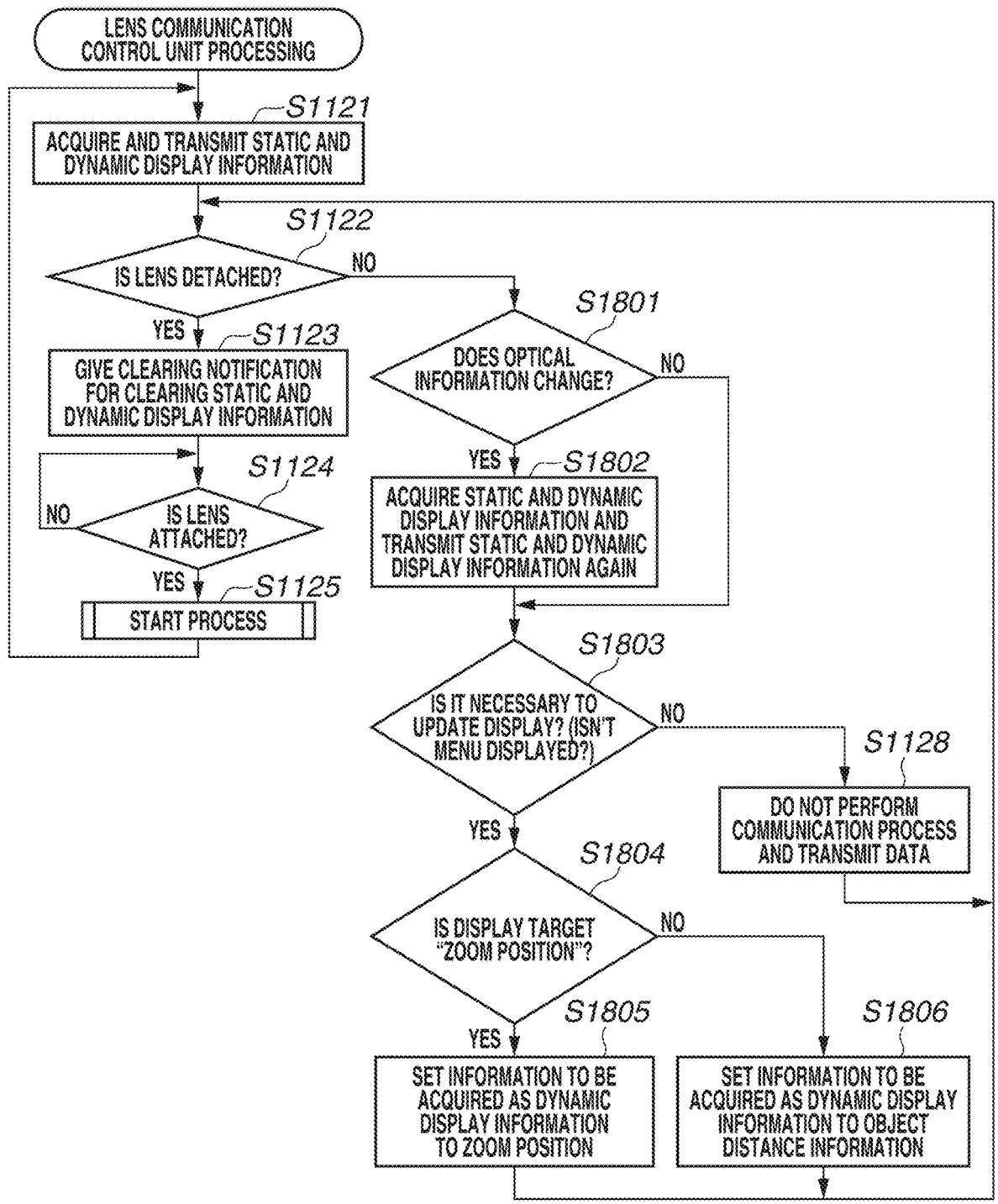
FIG. 18 is a flowchart illustrating a lens communication control unit process for displaying the zoom position information according to the third exemplary embodiment.

Next, with reference to FIG. 18, a lens communication control unit process according to the present exemplary embodiment will be described. As described above, however, the processes of steps S1121 to S1125 are similar to those in the first exemplary embodiment.

If the interchangeable lens 100 continues to be attached to the camera main body 200 in step S1122 (No in step S1122), the processing proceeds to step S1801.

In step S1801, the communication control unit 110 determines whether optical information regarding the attached lens 100 changes. If an intermediate accessory is attached between the interchangeable lens 100 and the camera main body 200, there is a case where the optical information regarding the lens 100 changes. For example, an extender is built into some model of the interchangeable lens 100. The optical information regarding the interchangeable lens 100, including the focal length, is changed by enabling the built-in extender. For example, FIG. 16 illustrates an external appearance 1630 as an example of the product form of the interchangeable lens 100. Various operation members 150 to 153 in FIG. 16 are similar to those in the first exemplary embodiment. An operation member 1631 is an operation member for switching the extender built into the interchangeable lens 100. The operation member 1631 as a selection switch enables selection of three states, i.e., "without extender", "1.4 times extender enabled", "2.0 times extender enabled".

In a case where the optical information changes due to a change in the attached state of the above extender, information acquired for static display also needs to be updated when the lens 100 is already attached or when the camera starts in the state where the lens 100 is attached.

Thus, if it is determined in step S1801 that the optical information changes (Yes in step S1801), then in step S1802, the communication control unit 110 acquires the static display information and the dynamic display information as initial values from the interchangeable lens 100 and transmits the static display information and the dynamic display information as initial values to the display unit 206 again.

If it is determined in step S1803 that it is necessary to update the display in the camera state (Yes in step S1803), the processing proceeds to step S1804.

In step S1804, the lens communication control unit 110 determines whether a target to be displayed is the "zoom position" in the menu of the camera. If the display target is the "zoom position" (Yes in step S1804), then in step S1805, the lens communication control unit 110 sets the dynamic display information to be acquired from the lens microcomputer 111 as "normalized placement position information on the zoom bar when the current zoom position is displayed on a bar", which is required to display the "zoom position". If the display target is not the "zoom position" but the "object distance information" (No in step S1804), then in step S1806, the lens communication control unit 110 sets information to be acquired from the lens microcomputer 111 to the following information required to display the object distance information described in the first exemplary embodiment.

1. whether object distance information is to be displayed or hidden
2. normalized position information regarding the current object distance on the distance bar
3. normalized position information regarding the focus limit on the infinity end side on the distance bar
4. normalized position information regarding the focus limit on the closest end side on the distance bar
5. normalized position information regarding the macro area on the distance bar More specifically, a communication command to acquire the "zoom position information" and a communication command to acquire the "object distance information" are defined and appropriately used according to the camera menu.

With reference to FIG. 16, a description is given of display contents, for example, in a case where a built-in 1.4 times extender is enabled, and a case where a built-in 2.0 times extender is enabled in step S1801.

A state 1610 illustrates an example where the current zoom position is displayed in a case where the 1.4 times extender is enabled. An icon 1611 indicates the focal length on the wide side. The focal length at the wide end is 70 mm when the extender is not present, whereas the icon 1611 indicates 98 mm, which is 1.4 times as much as 70 mm, is displayed.

An icon 1612 indicates the focal length on the telephoto side. The focal length on the telephoto side is 300 mm when the extender is not present, whereas the icon 1612 indicates 420 mm, which is 1.4 times as much as 300 mm. In this case, a fraction such as 98 mm is displayed on the premise that the visibility is higher if representative index values are displayed at the wide end and the telephoto end of the zoom. However, in a portion where 135 mm is displayed when the extender is not present, if a fraction such as 189 mm, which is 1.4 as much as 135 mm, is displayed, the display becomes complicated. In response, the interchangeable lens 100 generates information as the static display information together with normalized position information to deliberately display a position of "200 mm".

By the above communication method between the imaging apparatus and the accessory device and the above display process in the imaging apparatus, the position where information regarding the zoom position information to be displayed in the imaging apparatus is displayed is transmitted as a normalized numerical value to the imaging apparatus through communication. Consequently, no matter what imaging apparatus accessory devices different in specs are attached to, it is possible to perform optimal display.

Further, in the present exemplary embodiment, data regarding scale display for displaying the zoom position information is acquired when the accessory device is attached. Then, in a steady state, only the object distance information regarding the accessory device that dynamically changes is acquired. In addition to this, based on whether a display target is the object distance information or the zoom position information, a communication process is selectively performed, thereby minimizing the communication load. This reduces the influence on various types of control such as AF control, AE control, and image stabilization control and also enables communication for displaying an object to be performed frequently, such as every vertical signal timing. Thus, it is possible to perform various types of driving control and achieve the display of object distance information without delay in the display. Further, also in a case where the optical information changes during an operation, information required for scale display is acquired again and displayed, and when the optical information changes, an index is displayed optimally as an optical state after the change. Thus, it is possible to achieve display facilitating visual confirmation.

According to embodiments of the present disclosure, it is possible to appropriately display information based on an interchangeable lens at a camera display unit.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An imaging apparatus to which an accessory device including an optical member that changes a shooting condition is attachable, the imaging apparatus comprising at least one processor configured to perform operations of following units:
    a display unit including a display area where first index and second index of the shooting condition is displayed; and
    a communication control unit configured to control communication with the accessory device via a communication unit,
    wherein the communication control unit receives:
    (A) information indicating the first index;
    (B) information indicating a position of the first index to be displayed relative to the display area; and
    (C) information indicating the second index,
    wherein the first index does not change regardless of change of the shooting condition while the second index changes according to the shooting condition, and
    wherein both the first index and the second index correspond to same shooting condition but are displayed at different positions relative to the display area.

2. The imaging apparatus according to claim 1, wherein the shooting condition is distance corresponding to a focus lens position.

3. The imaging apparatus according to claim 1, wherein the shooting condition is object distance.

4. The imaging apparatus according to claim 1, wherein the shooting condition is focal distance.

5. An accessory device that is attachable to an imaging apparatus including a display unit including a display area where distance information corresponding to a zoom lens position is displayed, and includes a zoom lens that changes the zoom lens position, the accessory device comprising:
    at least one processor configured to perform operations of a communication control unit configured to control communication with the imaging apparatus via a communication unit,
    wherein the communication control unit transmits:
    (A) information indicating a number of indexes of distance information displayed in association with the display area;
    (B) information indicating indexes of distance information the number of which is indicated by the number;
    (C) information indicating a position of each index of distance information relative to the display area; and
    (D) information indicating distance information corresponding to the zoom lens position, and
    wherein the communication unit is capable of transmitting (D) the information indicating the distance information corresponding to the zoom lens position at timing different from timing to transmit (A) the information indicating the number, (B) the information indicating as many indexes of distance information as the number, and (C) the information indicating the position of each index of distance information relative to the display area.

6. The accessory device according to claim 5, wherein in a case where the display unit executes display corresponding to first distance information as distance information corresponding to the zoom lens position, and in a case where the zoom lens position changes, the communication control unit transmits information indicating second distance information different from the first distance information, as (D) the information indicating the distance information corresponding to the zoom lens position.

7. The accessory device according to claim 6, wherein through communication executed corresponding to supply of power, the communication control unit transmits (A) the information indicating the number, (B) the information indicating as many indexes of distance information as the number, and (C) the information indicating the position of each index of distance information relative to the display area.

8. The accessory device according to claim 7, wherein even in a case where an operation member is operated, the communication control unit does not transmit (A) the information indicating the number, (B) the information indicating as many indexes of distance information as the number, and (C) the information indicating the position of each index of distance information relative to the display area again.

9. The accessory device according to claim 5, wherein the communication control unit executes communication in a first communication format or a second communication format different from the first communication format, and
    wherein the communication control unit transmits in the first communication format (A) the information indicating the number, (B) the information indicating as many indexes of distance information as the number, and (C) the information indicating the position of each index of distance information relative to the display area and transmits in the second communication format (D) the information indicating the distance information corresponding to the zoom lens position.

10. The accessory device according to claim 9, wherein the communication control unit executes communication via first, second, and third communication terminals included in the communication unit, transmits data through a third communication channel via the third communication terminal according to a change in a signal level in a first communication channel via the first communication terminal, and receives data through a second communication channel via the second communication terminal according to transmission of the data, wherein in the second communication format, the communication control unit maintains a signal level in the third communication channel at a predetermined level, thereby notifying the imaging apparatus of a busy state, and wherein in the first communication format, the communication control unit does not notify the imaging apparatus of the busy state.

11. An imaging apparatus to which an accessory device including a zoom lens that changes a zoom lens position is attachable, the imaging apparatus comprising at least one processor configured to perform operations of following units:

a display unit including a display area where distance information corresponding to the zoom lens position is displayed; and a communication control unit configured to control communication with the accessory device via a communication unit, wherein the communication control unit receives:

(A) information indicating a number of indexes of distance information displayed in association with the display area;

(B) information indicating indexes of distance information the number of which is indicated by the number;

(C) information indicating a position of each index of distance information relative to the display area; and (D) information indicating distance information corresponding to the zoom lens position, and wherein the communication unit is capable of receiving (D) the information indicating the distance information corresponding to the zoom lens position at timing different from timing to receive (A) the information indicating the number, (B) the information indicating as many indexes of distance information as the number, and (C) the information indicating the position of each index of distance information relative to the display area.

12. The imaging apparatus according to claim 11, wherein in a case where the display unit executes display corresponding to first distance information as distance information corresponding to the zoom lens position, and in a case where the zoom lens position changes, the communication control unit receives information indicating second distance information different from the first distance information, as (D) the information indicating the distance information corresponding to the zoom lens position.

13. The imaging apparatus according to claim 12, wherein through communication executed corresponding to supply of power, the communication control unit receives (A) the information indicating the number, (B) the information indicating as many indexes of distance information as the number, and (C) the information indicating the position of each index of distance information relative to the display area.

14. The imaging apparatus according to claim 13, wherein even in a case where an operation member is operated, the communication control unit does not receive (A) the information indicating the number, (B) the information indicating as many indexes of distance information as the number, and (C) the information indicating the position of each index of distance information relative to the display area again.

15. The imaging apparatus according to claim 11, wherein the communication control unit executes communication in a first communication format or a second communication format different from the first communication format, and wherein the communication control unit receives in the first communication format (A) the information indicating the number, (B) the information indicating as many indexes of distance information as the number, and (C) the information indicating the position of each index of distance information relative to the display area and receives in the second communication format (D) the information indicating the distance information corresponding to the zoom lens position.

16. The imaging apparatus according to claim 15, wherein the communication control unit controls communication to execute communication via first, second, and third communication terminals included in the communication unit, receive data through a third communication channel via the third communication terminal according to a change in a signal level in a first communication channel via the first communication terminal, and transmit data through a second communication channel via the second communication terminal according to reception of the data, wherein in the second communication format, a signal level in the third communication channel is maintained at a predetermined level, thereby notifying the imaging apparatus of a busy state, and wherein in the first communication format, the imaging apparatus is not notified of the busy state.

17. A control method for controlling an imaging apparatus to which an accessory device including a focus lens that changes a focus lens position is attachable, and which includes a display unit including a display area where first index and second index of the shooting condition is displayed, the control method comprising:

controlling communication with the accessory device via a communication unit, wherein in the control of the communication, the following are received:

(A) information indicating the first index;

(B) information indicating a position of the first index to be displayed relative to the display area; and (C) information indicating the second index, wherein the first index does not change regardless of change of the shooting condition while the second index changes according to the shooting condition, and wherein both the first index and the second index correspond to same shooting condition but are displayed at different positions relative to the display area.

18. A control method for controlling an accessory device that is attachable to an imaging apparatus including a display unit including a display area where distance information corresponding to a zoom lens position is displayed, and includes a zoom lens that changes the zoom lens position, the control method comprising:

controlling communication with the imaging apparatus via a communication unit, wherein in the control of the communication, the following are transmitted:

(A) information indicating a number of indexes of distance information displayed in association with the display area;

(B) information indicating indexes of distance information a number of which is indicated by the number;

(C) information indicating a position of each index of distance information relative to the display area; and (D) information indicating distance information corresponding to the zoom lens position, and wherein in the control of the communication, (D) the information indicating the distance information corresponding to the zoom lens position is transmittable at timing different from timing to transmit (A) the information indicating the number, (B) the information indicating as many indexes of distance information as the number, and (C) the information indicating the position of each index of distance information relative to the display area.

19. A control method for controlling an imaging apparatus to which an accessory device including a zoom lens that changes a zoom lens position is attachable, and which includes a display unit including a display area where distance information corresponding to the zoom lens position is displayed, the control method comprising:

controlling communication with the accessory device via a communication unit, wherein in the control of the communication, the following are received:

(A) information indicating a number of indexes of distance information displayed in association with the display area;

(B) information indicating indexes of distance information a number of which is indicated by the number;

(C) information indicating a position of each index of distance information relative to the display area; and (D) information indicating distance information corresponding to the zoom lens position, and wherein in the control of the communication, (D) the information indicating the distance information corresponding to the zoom lens position is receivable at timing different from timing to receive (A) the information indicating the number, (B) the information indicating as many indexes of distance information as the number, and (C) the information indicating the position of each index of distance information relative to the display area.

* * * * *